United States Patent
Kanda et al.

[11] Patent Number: 5,373,454
[45] Date of Patent: Dec. 13, 1994

[54] PROBLEM DIAGNOSIS SYSTEM IN PRESSURE DEVICE CONTROL APPARATUS

[75] Inventors: Toshiya Kanda; Yoshitaka Miyakawa; Masayoshi Wada; Kougyoku Go, all of Saitama, Japan

[73] Assignee: Honda Giken Kogyo Kabushiki Kaisha, Tokyo, Japan

[21] Appl. No.: 820,419

[22] Filed: Jan. 14, 1992

[30] Foreign Application Priority Data

Jan. 16, 1991 [JP] Japan .................... 3-848[U]
Feb. 4, 1991 [JP] Japan .................... 3-3602[U]
Feb. 4, 1991 [JP] Japan .................... 3-3603[U]

[51] Int. Cl.$^5$ .............................................. G01B 13/00
[52] U.S. Cl. ...................... 364/551.01; 364/509; 364/510; 364/558; 364/424.03; 73/37; 73/40; 303/116.1; 303/DIG. 3; 303/DIG. 4; 303/119.1
[58] Field of Search ................. 303/92, 116.1, DIG. 3, 303/DIG. 4, 119.1; 60/418; 73/37, 40; 364/551.01, 509, 510, 558, 424.03, 424.04

[56] References Cited

U.S. PATENT DOCUMENTS

| | | | |
|---|---|---|---|
| 4,715,786 | 12/1987 | Wolff et al. ........................ | 364/510 |
| 4,738,112 | 4/1988 | Nomura et al. ...................... | 60/721 |
| 4,824,182 | 4/1989 | Steffes et al. ................. | 303/DIG. 4 |
| 4,895,416 | 1/1990 | Tozu et al. ...................... | 303/116.1 |
| 4,976,501 | 12/1990 | Sivulka et al. ................ | 303/DIG. 4 |
| 5,004,299 | 4/1991 | Brearley et al. ..................... | 303/92 |
| 5,039,175 | 8/1991 | Holzmann et al. .................... | 303/92 |
| 5,080,449 | 1/1992 | Maehara ......................... | 303/119.1 |
| 5,171,073 | 12/1992 | Matsuda et al. ................. | 303/116.1 |
| 5,221,125 | 6/1993 | Okochi et al. ................. | 303/DIG. 4 |

FOREIGN PATENT DOCUMENTS

| | | |
|---|---|---|
| 0079715A1 | 5/1983 | European Pat. Off. . |
| 0147720 | 7/1985 | European Pat. Off. ............. 303/92 |
| 0305950A1 | 3/1989 | European Pat. Off. . |
| 3404135 | 8/1985 | Germany ......................... 303/116.1 |
| 3518985A1 | 11/1986 | Germany . |
| 2215793 | 9/1989 | United Kingdom ............. 303/116.1 |

OTHER PUBLICATIONS

European Search Report dated Dec. 1, 1992.

*Primary Examiner*—Jack B. Harvey
*Assistant Examiner*—Hal D. Waschman
*Attorney, Agent, or Firm*—Armstrong, Westerman, Hattori, McLeland & Naughton

[57] ABSTRACT

A pressure device control apparatus including a pressure source having a pump, and an accumulator connected to the pump and a pressure device, and a pressure detector for detecting the pressure in the accumulator; a normally-closed type solenoid valve interposed between the pressure device and the accumulator or a fluid tank; and a control unit having a drive control device for outputting a driving signal indicative of a command to operate the pump in response to a detection pressure detected in the pressure detector becoming equal to or less than a first predetermined pressure and a drive stopping signal indicative of a command for stopping the operation of the pump in response to the detection pressure becoming equal to or more than a second predetermined pressure which is higher than the first predetermined pressure. The control unit includes a first energizing unit for energizing the normally-closed type solenoid valve for a first predetermined time after the drive control device outputs the drive stopping signal, and a deciding unit for deciding that there is a problem in response to the detection pressure detected in the pressure detector becoming equal to or less than the first predetermined pressure after the energization of the normally-closed type solenoid valve by the first energizing unit is completed. This invention ensures that the diagnosis of the problem in the pressure device control apparatus can be reliably effected by the release of the pressure in the accumulator after the pressure increase thereof to a level equal to or more than the second predetermined pressure.

17 Claims, 12 Drawing Sheets

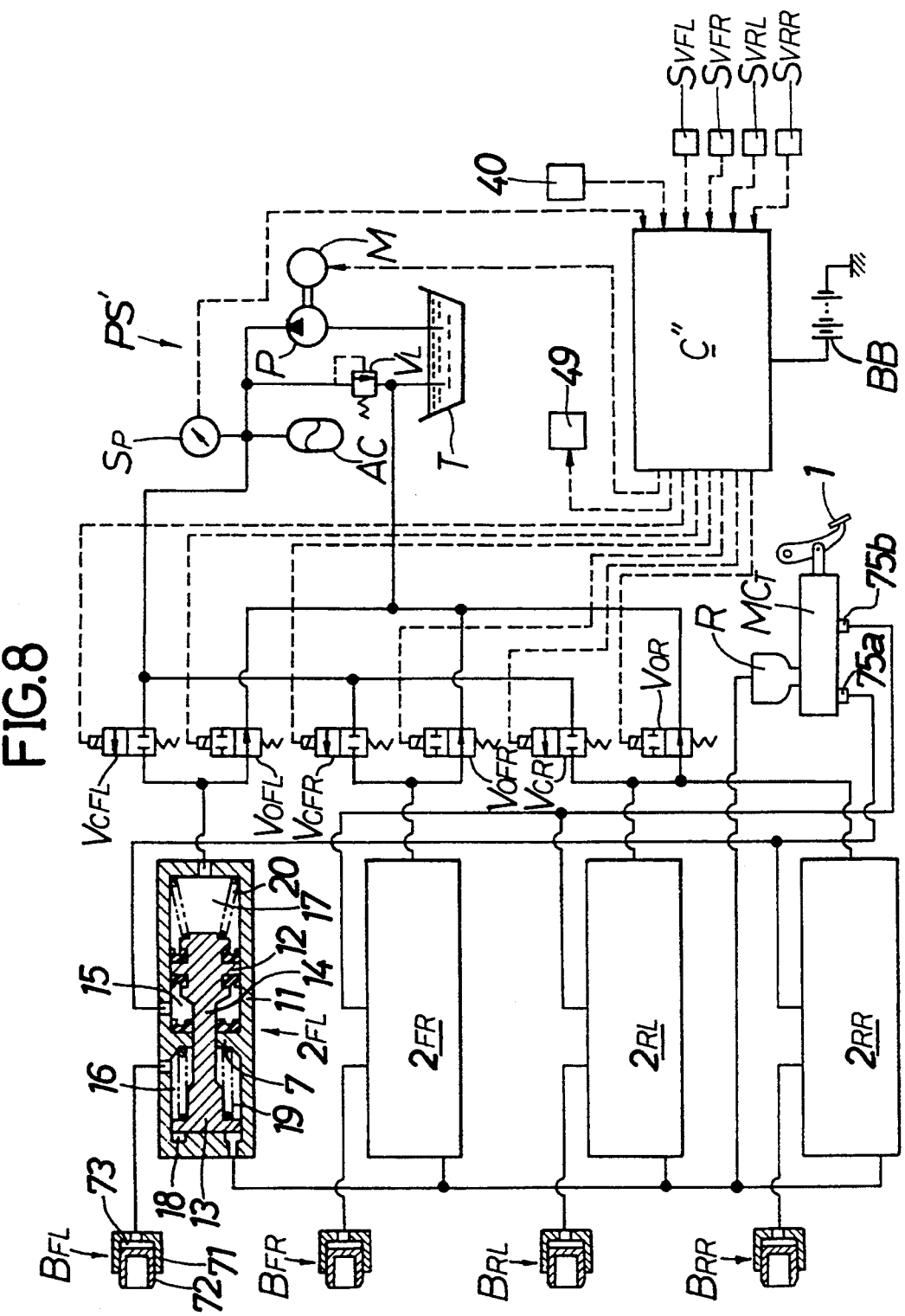

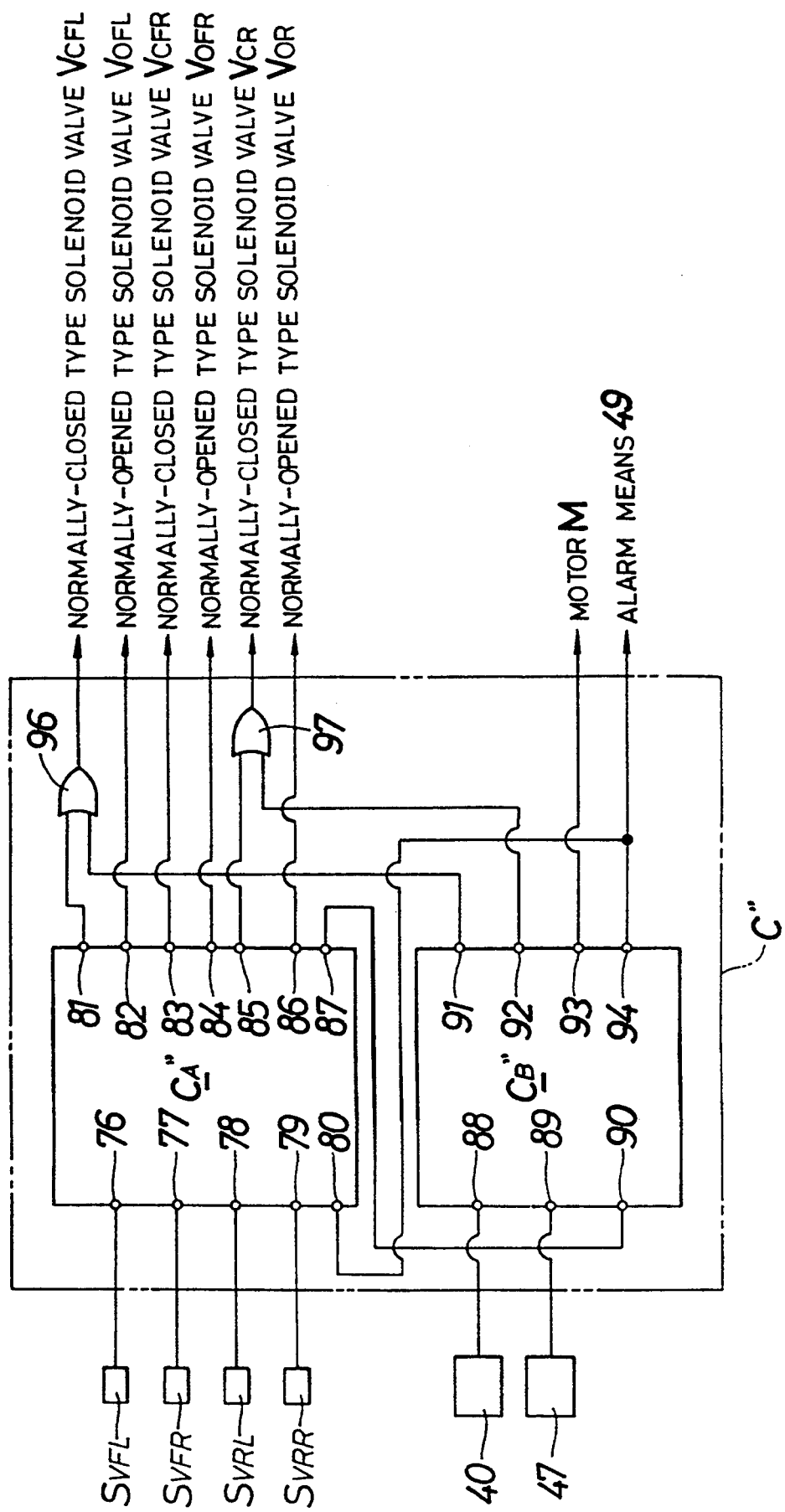

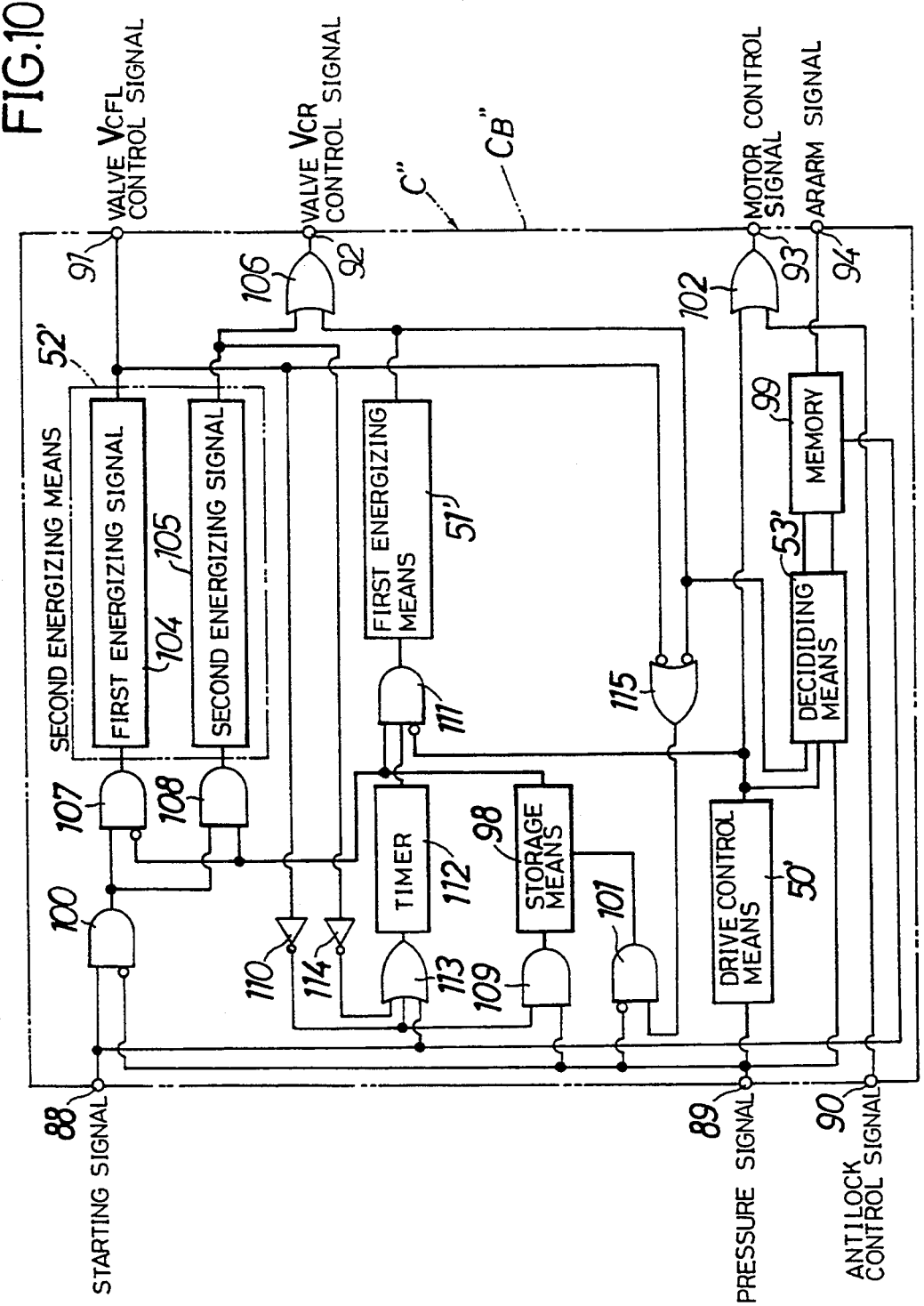

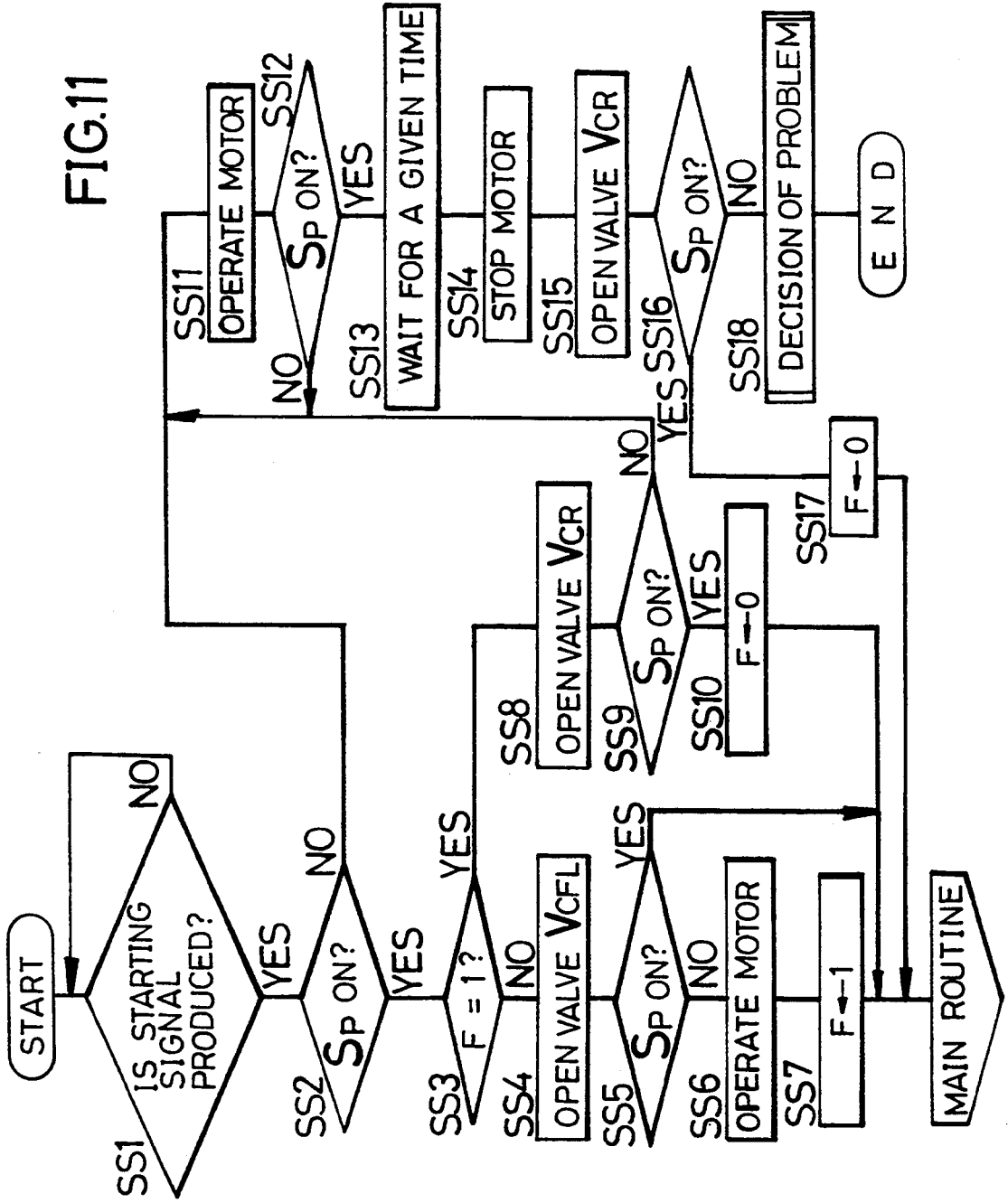

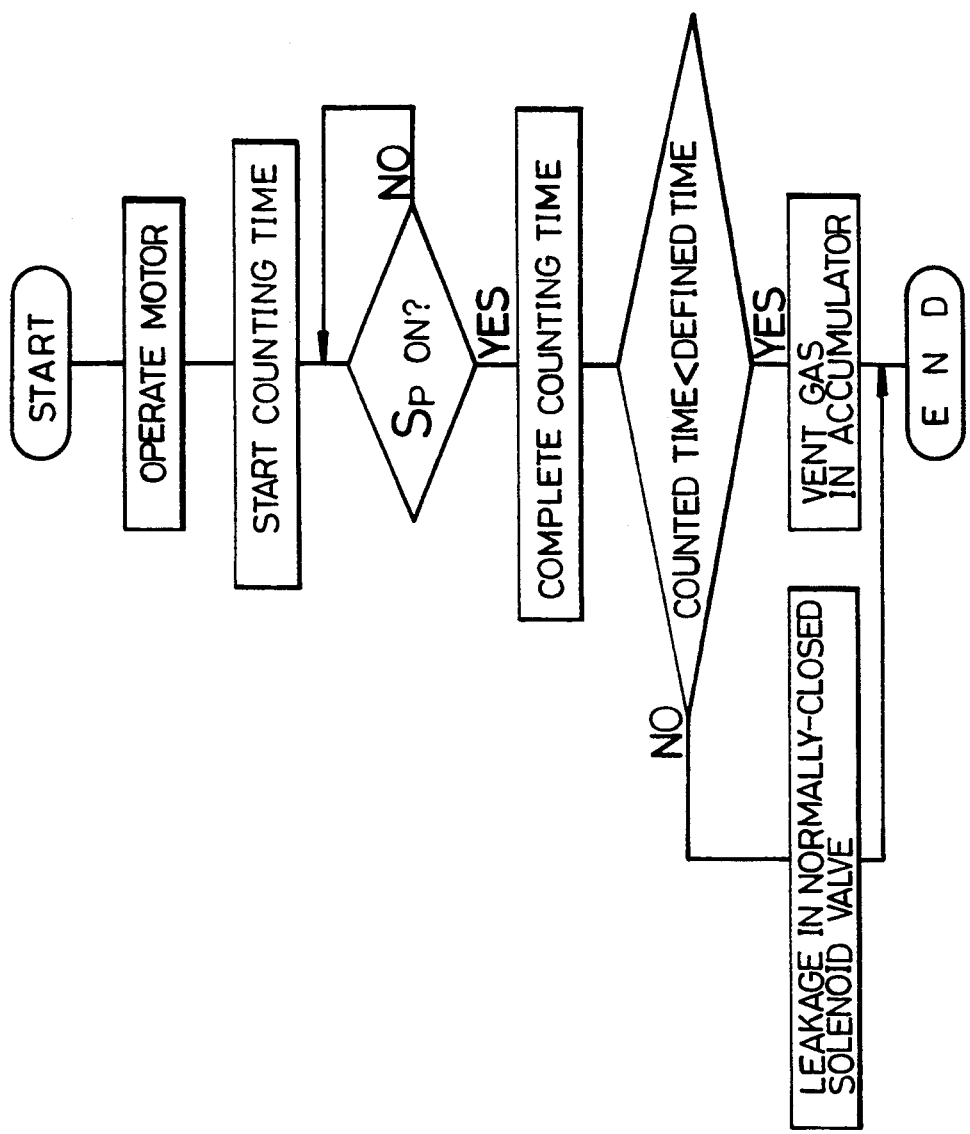

PROBLEM DIAGNOSIS SYSTEM IN PRESSURE DEVICE CONTROL APPARATUS

BACKGROUND OF THE INVENTION

1. Field of the Invention

This invention generally relates to a system for diagnosing trouble in a pressure device control apparatus which includes: a pressure source having a pump for pumping a fluid from a fluid tank, an accumulator connected to the pump and a pressure device, and a pressure detector for detecting pressure in the accumulator; a normally-closed type solenoid valve interposed between the pressure device and the accumulator or the fluid tank; and a control unit having a drive control means adapted to produce a driving signal indicative of a command to operate the pump in response to a detection pressure detected in the pressure detector becoming equal to or less than a first predetermined pressure and to produce a drive stopping signal indicative of a command to stop the operation of the pump in response to the detection pressure becoming equal to or more than a second predetermined pressure which is higher than the first predetermined pressure.

2. Description of the Relevant Art

A pressure device control apparatus is used, for example, in a hydraulic braking pressure control apparatus for a vehicle as disclosed in Japanese Laid-open Patent Application No. 279499/90, but in this pressure device control apparatus, if, for example, the accumulator breaks down or has a problem, and sufficient pressure cannot be insured, it is difficult to insure the performance of the pressure device. Therefore, it is required to monitor the problem. To this end, it is conventional practice to detect the position of a piston in the accumulator, to constantly monitor the pressure in a back pressure chamber in the accumulator or to detect the elapsed time for an increase in pressure in the accumulator.

In the techniques including the detection of the position of the piston in the accumulator or the constant monitoring of the pressure in the back pressure chamber in the accumulator, a detector is required; thereby, resulting in an increase in the number of parts and an increase in cost and additional technical difficulties. Also, in the technique including the detection of the elapsed time for the increase in pressure in the accumulator, it is difficult to detect the trouble with high accuracy.

SUMMARY OF THE INVENTION

Accordingly, it is an object of the present invention to provide a trouble diagnosis system in a pressure device control apparatus, wherein the above problems are overcome.

In order to achieve the above object, according to the present invention, there is provided a problem diagnosis system in a pressure device control apparatus which includes: a pressure source having a pump for pumping a fluid from a fluid tank, an accumulator connected to the pump and a pressure device and a pressure detector for detecting the pressure in the accumulator; a normally-closed type solenoid valve interposed between the pressure device and the accumulator or the fluid tank; and a control unit having a drive control means adapted to output a driving signal indicative of a command to operate the pump in response to a detection pressure detected in the pressure detector becoming equal to or less than a first predetermined pressure and to output a drive stopping signal indicative of a command to stop the operation of the pump in response to the detection pressure becoming equal to or more than a second predetermined pressure which is higher than the first predetermined pressure. The control unit includes a first energizing means for energizing the normally-closed type solenoid valve for a first predetermined time after the drive control means outputs the drive stopping signal, and a deciding means for deciding that there is a problem in response to the detection pressure detected in the pressure detector becoming equal to or less than the first predetermined pressure after the energization of the normally-closed type solenoid valve by the first energizing means is completed, the first predetermined time being set shorter than a time taken for the reduction of the pressure in, the accumulator, which is normal, from a predetermined level equal to or more than the second predetermined pressure to the first predetermined pressure in response to an opening of the normally-closed type solenoid valve.

Thus, the instant invention ensures that the diagnosis of the trouble in the pressure device control apparatus can reliably be effected by releasing the pressure in the accumulator after increasing thereof to a level equal to or more than the second predetermined pressure.

According to another aspect of the present invention, the accumulator includes a displacing member carried in a housing and having opposite surfaces facing an accumulator chamber leading to the pump and a gas-charged chamber, respectively. The control unit includes a storage means adapted to store the fact that the detection pressure detected in the pressure detector has become equal to or less than the first predetermined pressure in response to the energization of the normally-closed type solenoid valve by the second energizing means and to output a storage signal indicating the storage of such fact. The first energizing means is arranged to energize the normally-closed type solenoid valve for the first predetermined time after an output of the drive stopping signal by the drive control means when the storage signal is outputted from the storage means.

Therefore, if there is a significant chance or possibility that there is a venting of gas occurring in the accumulator, the pressure in the accumulator is released twice; thereby, resulting in a high accuracy for diagnosis of the problem. If there is a small possibility of the venting of gas, the wasteful operation of the normally-closed type solenoid valve is suppressed, and the reduction of the pressure in the accumulator to a level equal to or less than the first predetermined pressure is stored; thereby, preparing for a next diagnosis.

According to a further aspect of the present invention, the deciding means decides that there is a venting of gas occurring in the accumulator when a time from an instant when the driving signal indicative of a command to drive the pump is outputted from the drive control means in response to the detection pressure detected in the pressure detector becoming equal to or less than the first predetermined pressure after the completion of the energization of the normally-closed type solenoid valve by the first energizing means to an instant when the second predetermined pressure is detected by the pressure detector is less than a defined time. The deciding means also decides that there is a leakage occurring in the normally-closed type solenoid valve when such time is equal to or more than the defined time.

Therefore, it is possible to decide whether there is a venting of gas occurring in the accumulator or a leakage occurring in the normally-closed type solenoid valve on the basis of the elapsed time for increasing the pressure in the accumulator from the first predetermined pressure to the second predetermined pressure and to promptly carry out a measure after a problem; such as, a repair which is appropriate for the type of the existing problem.

The above and other objects, features and advantages of this invention will become apparent from a reading of the following description of the preferred embodiments taken in conjunction with the accompanying drawings.

BRIEF DESCRIPTION OF THE DRAWINGS

FIGS. 1 to 6 illustrate a first embodiment of the present invention, wherein

FIG. 1 is a diagram of a hydraulic system in a brake device for an automobile;

FIG. 2 is a longitudinal sectional view of an accumulator;

FIG. 3 is a diagram of an accumulating operation characteristic of the accumulator;

FIG. 4 is a graph illustrating a range of detection by a pressure detector;

FIG. 5 is a circuit diagram illustrating an arrangement of an essential portion of a control unit; and FIG. 6 is a flow chart illustrating a procedure of control by the control unit;

FIGS. 8 to 12 illustrate a third embodiment of the present invention, wherein FIG. 8 is a diagram of a hydraulic system in a brake device for an automobile;

FIG. 9 shows an arrangement of a control unit;

FIG. 10 is a circuit diagram illustrating an arrangement of a problem diagnosis section in the control unit; and FIGS. 11 and 12 are flow charts illustrating a problem diagnosis procedure.

DESCRIPTION OF THE PREFERRED EMBODIMENTS

The present invention will now be described by way of embodiments applied to a brake device for an automobile in connection with the accompanying drawings.

Figure 1:
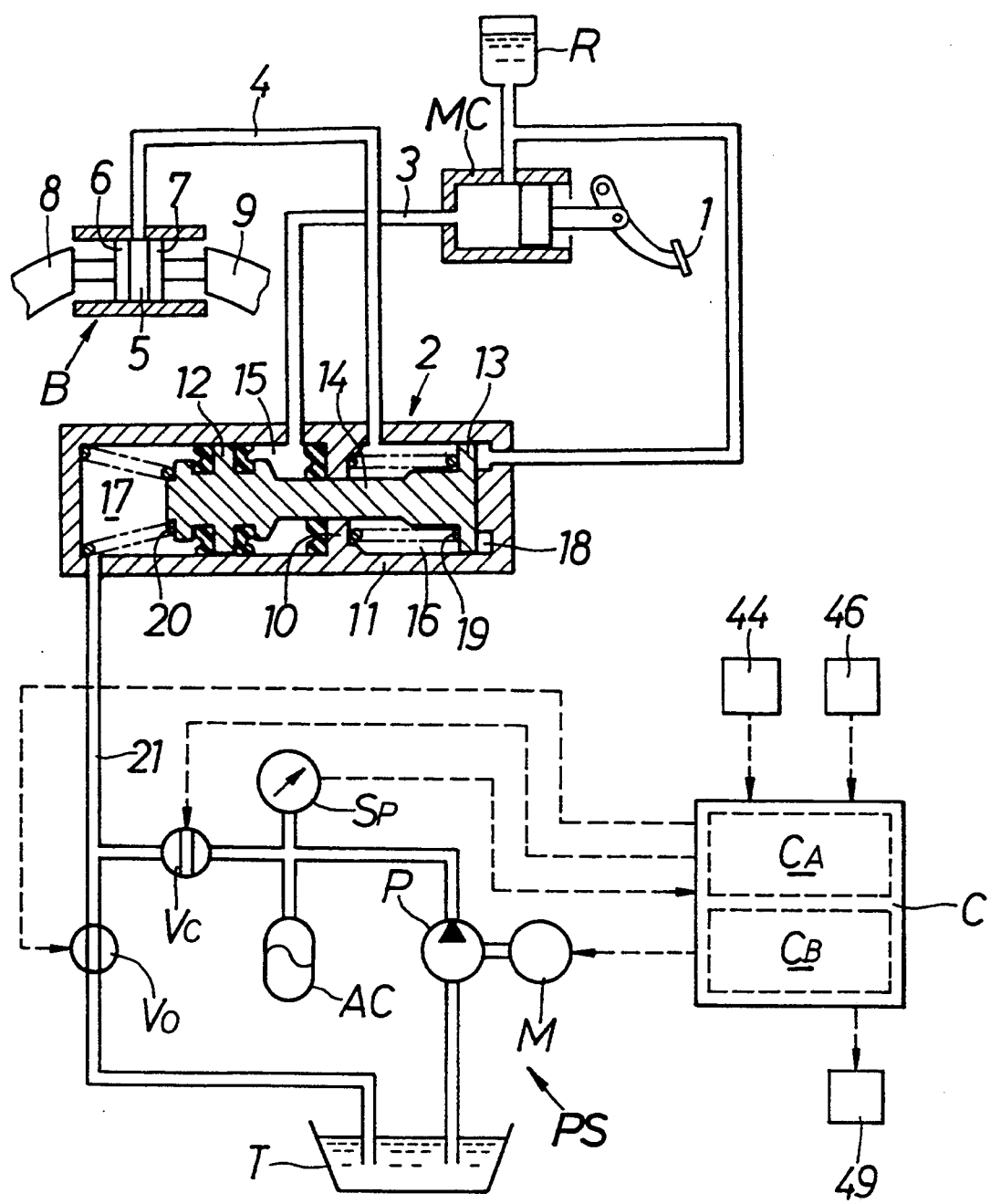

FIGS. 1 to 6 illustrate a first embodiment of the present invention. Referring first to FIG. 1, a brake pedal 1 is operatively connected to a master cylinder MC, and an output hydraulic pressure from the master cylinder MC is transmitted via a modulator 2 serving as a pressure device to a wheel brake B.

In the wheel brake B, a hydraulic pressure passage 4 is connected to a braking fluid chamber 5, and the supply of a hydraulic pressure through the hydraulic pressure passage 4 into the braking fluid chamber 5 causes brake pistons 6 and 7 to be operated away from each other so that brake shoes 8 and 9 come into contact with a brake drum (not shown) to produce a braking torque.

If the hydraulic braking pressure within the braking fluid chamber 5 is too large, a braking torque produced between each of the brake shoes 8 and 9 and the brake drum becomes too large; thereby, resulting in a locked state for a wheel. For this reason, if the wheel is about to enter into its locked state, the hydraulic braking pressure is reduced by the modulator 2; thereby, preventing the wheel from its locked state.

The modulator 2 includes a housing 11 formed into a cylindrical shape with its opposite ends occluded and partitioned at its axially intermediate portion by a partition wall 10, and a rod 14 having pistons 12 and 13 at its opposite ends with a portion of the rod 14 between the pistons 12 and 13 axially slidably passing through the partition wall 10. A primary hydraulic braking pressure chamber 15 is defined between the partition wall 10 and the piston 12 in order to communicate with the master cylinder MC through a hydraulic pressure passage 3. A secondary hydraulic braking pressure chamber 16 is defined between the partition wall 10 and the piston 13 in order to communicate with the braking fluid chamber 5 through the hydraulic pressure passage 4. An anti-lock control hydraulic pressure chamber 17 is defined between one of end walls of the housing 11 and the piston 12, while a releasing fluid chamber 18 is defined between the other end wall of the housing 11 and the piston 13 in order to communicate with a reservoir R for the master cylinder MC. A spring 19 is contained in the secondary hydraulic braking pressure chamber 16 for biasing the piston 13 away from the partition wall 10, while a spring 20 is contained in the anti-lock control hydraulic pressure chamber 17 for biasing the piston 12 toward the partition wall 10.

A hydraulic pressure passage 21 is connected to the anti-lock control hydraulic pressure chamber 17 as well as to a pressure source PS through a normally-closed type solenoid valve $V_c$ and also to a fluid tank T through a normally-opened type solenoid valve $V_o$. The pressure source PS includes a pump P for pumping a working fluid from the fluid tank T, an accumulator AC connected to the pump P, and a pressure detector $S_p$ for detecting the pressure in the accumulator AC. The on-off operation of a motor M connected to the pump, and the opening and closing operations of the solenoid valves $V_c$ and $V_o$ are controlled by a control unit C.

Figure 2:
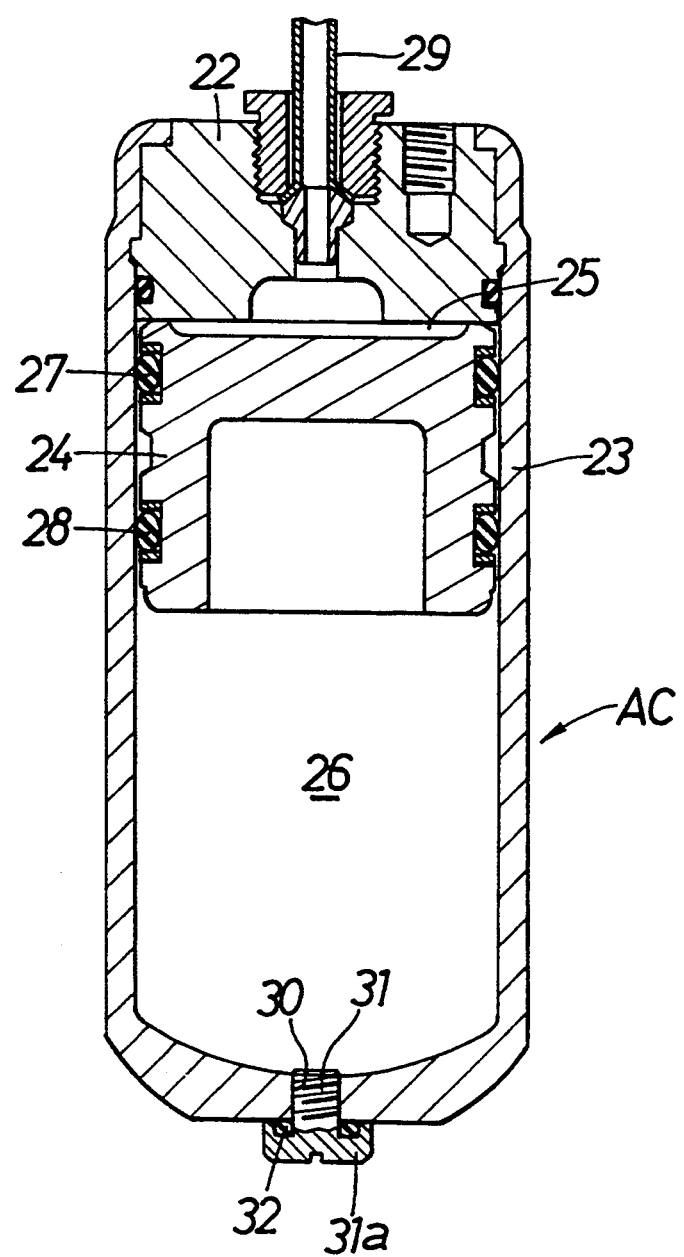

Referring now to FIG. 2, the accumulator AC includes a cylinder 23 which is formed into a bottomed cylindrical shape with one end closed and is occluded at the other end by a lid member 22; and a piston 24 slidably received in the cylinder 23. An accumulator chamber 25 is defined between the lid member 22 and the piston 24, while a gas chamber 26 is defined between one end of the cylinder 23 and the piston 24.

A pair of annular sealing members 27 and 28 are fitted over an outer surface of the piston 24 to come into sliding contact with an inner surface of the cylinder 23. A connecting pipe 29 is connected to the lid member 22 which leads to the accumulator chamber 25. The connecting pipe 29 is also connected to the pump P and to the hydraulic-pressure passage 21 through the normally-closed solenoid valve $V_c$. Further, the gas chamber 26 is charged with gas, and the cylinder 23 is provided at its one or closed end with a gas-charging hole 30 which is openably and closably occluded by a plug 31. Moreover, an increased-diameter head 31a is provided on the plug 31, and an annular sealing member 32 is interposed between the increased-diameter head 31a and an outer surface of the above-mentioned end of the cylinder 23.

Figure 3:
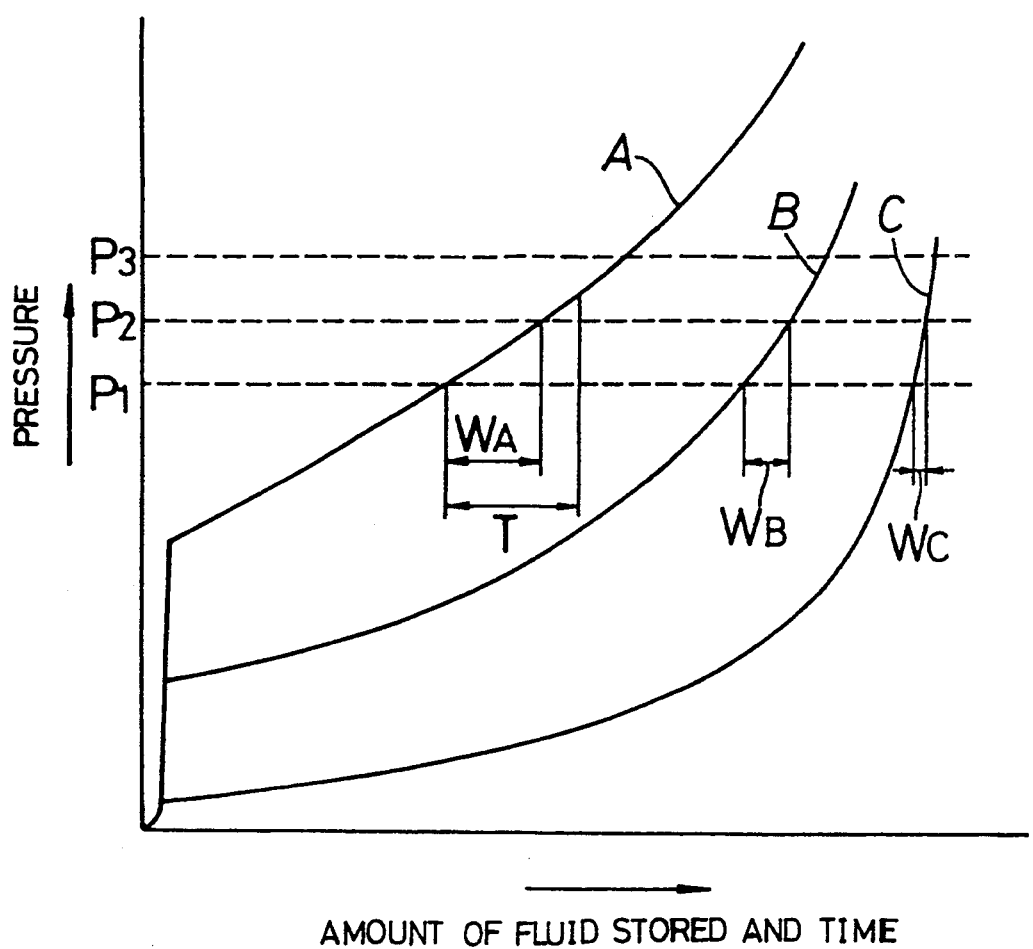

In such an accumulator AC, the pressure in the accumulator chamber 25 is varied, as shown by a curve A in FIG. 3, when the accumulator AC is in normal operation with no gas vented from the gas chamber 26, whereas the pressure in the accumulator chamber 25 is varied, as shown by a curve B in FIG. 3, when the accumulator AC is in a problematic state having a small amount of gas being vented from the gas chamber 26. Further, the pressure in the accumulator chamber 25 is varied, as shown in curve C in FIG. 3, when the accumulator AC is in a problematic state having a large amount of the gas being vented from the gas chamber 26.

Figure 4:
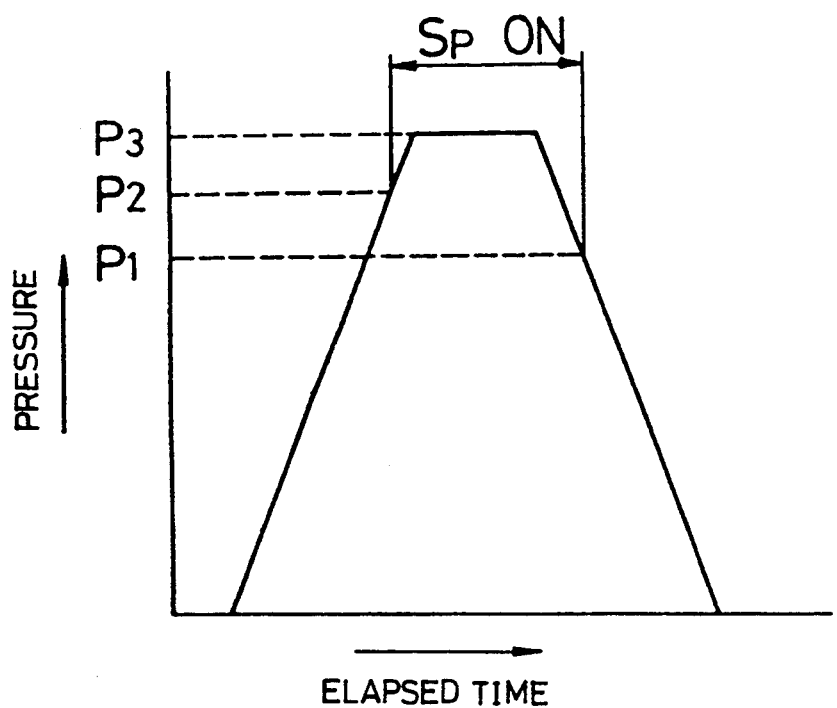

The pressure detector $S_p$ is a pressure switch which is turned ON in response to the pressure in the accumulator chamber 25 with the accumulator AC exceeding a second predetermined pressure $P_2$ during an increase in pressure. The pressure detector $S_p$ is a pressure switch which is turned OFF in response to the pressure in the accumulator chamber 25 becoming equal to or less than a first predetermined pressure $P_1$, lower than the second predetermined pressure $P_2$ during reduction of the pressure, as shown in FIG. 4.

In the state shown in curve A in which the accumulator AC is in normal operation, the width corresponding to the time or the accumulated amount taken for increasing of the pressure in the accumulator chamber 25 from the first predetermined pressure $P_1$ to the second predetermined pressure $P_2$ is of a relatively large value $W_A$. In a condition having a problem, as shown in curve B, with a small amount of gas being vented from the gas chamber 26, the width is of a relatively small value $W_B$. Further, in a condition having a problem, as shown in curve C, with a large amount of the gas being vented from the gas chamber 26, the width is of a further decreased value $W_c$.

The control unit C includes an anti-lock control section $C_A$ for providing an anti-lock control of the braking pressure of the wheel brake B, and a problem diagnosis section $C_B$ for diagnosing the trouble of the accumulator AC. The control operation of the anti-lock control section $C_A$ is first described below.

In a condition in which the normally-closed type solenoid valve $V_c$ is closed and the normally-opened type solenoid valve $V_o$ is opened by the anti-lock control section $C_A$ of the control unit C, the anti-lock control hydraulic pressure chamber 17 in the modulator 2 is opened into the fluid tank T through the hydraulic pressure passage 21 and the normally-opened type solenoid valve $V_o$. If the brake pedal 1 is depressed down to permit the hydraulic pressure from the master cylinder MC to be supplied to the primary hydraulic braking pressure chamber 15, the volume of the secondary hydraulic braking chamber 16 is decreased, and the hydraulic braking pressure corresponding to the hydraulic pressure from the master cylinder MC is supplied to the braking fluid chamber 5 in the wheel brake B. Thus, the torque during braking can be freely increased in accordance with a braking operation by a driver.

If the normally-closed type solenoid valve $V_c$ is opened and the normally-opened type solenoid valve $V_o$ is closed, the hydraulic pressure from the accumulator AC is supplied to the anti-lock control hydraulic braking pressure chamber 17. Thus, notwithstanding the hydraulic pressure from the master cylinder MC being applied to the primary hydraulic braking pressure chamber 15, the volume of the secondary hydraulic braking pressure chamber 16 is increased, and the hydraulic pressure in the braking fluid chamber 5 in the wheel brake B is decreased in order to reduce the braking torque. Therefore, the wheel can be prevented from entering into its locked state by opening the normally-closed type solenoid valve $V_c$ and closing the normally-opened type solenoid valve $V_o$ when the wheel is about to enter into its locked state.

The arrangement of the trouble diagnosis section $C_B$ in the control unit C is now described with reference to FIG. 5. The problem diagnosis section $C_B$ includes three input terminals 34, 35 and 36, and three output terminals 37, 38 and 39. Starting-signal generating means 40 and 41 are connected to the input terminals 34 and 35, respectively. One of the starting-signal generating means 40 is arranged in order to turn ON and OFF a transistor 43 connected to a power source terminal 42 by the ON and OFF operations of a key switch 44 for starting an engine mounted in a vehicle, and a high level signal is applied to the input terminal 34 by turning ON the key switch 44. The other starting-signal generating means 41 is arranged to turn ON and OFF a transistor 45 connected to the power source terminal 42 by the ON and OFF operation of a manually operated trouble-diagnosis switch 46, and a high level signal is applied to the input terminal 35 by turning ON the problem-diagnosis switch 46. A pressure signal generating means 47 is connected to the input terminal 36. The pressure signal generating means 47 is arranged such that it turns ON and OFF a transistor 48 connected to the power source terminal 42 in response to the ON and OFF operation of the pressure detector $S_p$ so that a low level signal is applied to the input terminal 36 when the pressure detector $S_p$ is turned ON. Further, the output terminal 37 is connected to the normally-closed type solenoid valve $V_c$; and the output terminal 38 is connected to the motor M. Also the output terminal 39 is connected to an alarm means 49; such as, an alarm lamp.

The problem diagnosis section $C_B$ includes a drive control means 50 adapted to produce a driving signal indicative of a command in order to operate the pump P in response to the detection pressure detected in the pressure detector $S_p$ becoming equal to or less than the first predetermined pressure $P_1$, and to produce a drive,stopping signal indicative of a command so as to stop the operation of the pump P in response to such a detection pressure becoming equal to or more than the second predetermined pressure $P_2$. The problem diagnosis section $C_B$ also includes a first energizing means 51 for energizing the normally-closed type solenoid valve $V_c$ for a first predetermined time $T_1$ after the drive-stopping signal has been produced by the drive control means 50; a second energizing means 52 for energizing the normally-closed type solenoid valve $V_c$ for a second predetermined time $T_2$ in response to the operation of the key switch 44 or the trouble diagnosis switch 46. The problem diagnosis section $C_B$ further includes a deciding means 53 for deciding that the accumulator AC has a problem in response to the detection pressure detected in the pressure detector $S_p$ becoming equal to or less than the first predetermined pressure $P_1$ after completion of the energization of the solenoid valve $V_c$ by the first energizing means 51; an AND gate 54 serving as a first inactivating means for inactivating the second energizing means 52 when the detection pressure detected in the pressure detector $S_p$ is equal to or less than the first predetermined pressure $P_1$ at the time of the operation of the key switch 44 or the problem diagnosis switch 46; and an AND gate 55 serving as a second inactivating means for inactivating the first energizing means 51, except after the energization of the solenoid valve $V_c$ by the second energizing means 52.

The drive control means 50 is formed as an off-delay timer. The input terminal 36 is connected to an input terminal of the drive control means 50 having an output terminal being connected to the output terminal 38. Thus, the drive control means 50 is adapted to provide a high level driving signal from the output terminal 38 to the motor M as soon as the pressure detector $S_p$ is turned OFF, and a high level signal is supplied from the pressure signal generating means 47 to the input terminal 36, and to provide a low level signal as a drive stopping signal to the motor M after a lapse of a given time (e.g., 1,000 m sec.) from an instant when the pressure detector $S_p$ is turned ON and the signal received by the input terminal 36 goes to a low level.

The first energizing means 51 is a monostable circuit and is adapted to produce a high level signal which is sustained for the first predetermined time $T_1$ from an instant when a high level signal is received thereinto. The first predetermined time $T_1$ is set at a value (e.g., 300 m sec.) shorter than a time T taken for reducing the pressure in the accumulator AC from a predetermined pressure which is equal to or more than the second predetermined pressure $P_2$ down to the first predetermined pressure $P_1$ in response to the opening of the normally-closed solenoid valve $V_c$ when the accumulator AC is in a normal state (i.e., the state as shown in curve A in FIG. 3).

The second energizing means 52 is also a monostable circuit and is adapted to produce a high level signal sustained for the second predetermined time $T_2$ from an instant when a high level signal is received thereinto. The second predetermined time $T_2$ is set at a value (e.g., 300 m sec.) shorter than the elapsed time T for reducing the pressure in the accumulator AC from the predetermined pressure equal to or more than the second predetermined pressure $P_2$ down to the first predetermined pressure $P_1$ in response to the opening of the normally-closed solenoid valve $V_c$ when the accumulator AC is in the normal state (i.e., the state as shown in curve A in FIG. 3).

Outputs from the first and second energizing means 51 and 52 are inputted to an OR gate 59 having an output terminal connected to the output terminal 37. Thus, the normally-closed type solenoid valve $V_c$ is energized and opened in response to the output of a high level signal by at least one of the energizing means 51 and 52.

An output from the AND gate 54 is inputted to the second energizing means 52. An output signal from the OR gate 58 is applied to the AND gate 54, while a signal received into the input terminal 36 is applied in an inversed manner to the AND gate 54. Both the input terminals 34 and 35 are connected to the OR gate 58 in parallel. Thus, the AND gate 54 is adapted to apply a high level signal to the second energizing means 52 in response to the ON operation of at least one of the key switch 44 and the problem diagnosis switch 46 only in a state where a signal which is inputted to the input terminal 36 is of low level; i.e., the pressure detector $S_p$ is ON.

An output from the AND gate 55 is inputted to the first energizing means 51. An output signal from the drive control means 50 is applied in an inversed manner to the AND gate 55, while an output signal from a timer 57 is applied to the AND gate 55. A signal from an OR gate 60 is inputted into the timer 57, and an output signal from the OR gate 58 is applied to the OR gate 60, while an output signal from the second energizing means 52 is inversed by an inverter 56 and applied to the OR gate 60. Thus, a high level signal is produced from the OR gate when the output signal from the OR gate 58 rises; i.e., when at least one of the key switch 44 and the trouble diagnosis switch 46 is turned ON or when the output signal from the second energizing means 52 falls; i.e., when the opening of the normally-closed type solenoid valve $V_c$ is completed in response to a turning-ON of at least one of the key switch 44 and the problem diagnosis switch 46. The timer 57 outputs a high level signal which is sustained for a given time from an instant when the high level signal is inputted. The above-described given time set in the timer 57 is determined at a value substantially equal to a time taken for increasing the pressure in the accumulator AC from the first predetermined pressure $P_1$ up to the second predetermined pressure $P_2$ by the operation of the pump P when the accumulator AC is in its normal state. This ensures that the AND gate 55 provides a high level signal to the first energizing means 51 only when the pressure in the accumulator AC is increased to a level equal to or more than the second predetermined pressure $P_2$ within a given time after a turning-ON of at least one of the key switch 44 and the trouble diagnosis switch 46 or within a given time after completion of the energization of the normally-closed type solenoid valve $V_c$ by the second energizing means 52; thereby, terminating the operation of the pump P.

A signal from the input terminal 36 and an output signal from the first energizing means 51 are inputted into the deciding means 53, and an output signal from the deciding means 53 is provided through the output terminal 39 to the alarm means 49. When the changing of the output signal from the first energizing means 51 is changed from a high level to a low level (i.e., when the completion of the energizing means 51 is completed), and if the detection pressure detected in the pressure detector $S_p$ is equal to or more than the first predetermined pressure $P_1$ (i.e., if the output signal from the pressure signal generation means 47 is of a high level), then the deciding means 53 provides a high level signal to the alarm means 49 which is in turn operated so as to provide an alarm in response to a reception of the high level signal on the basis of the decision that the accumulator AC has a problem.

Figure 6:
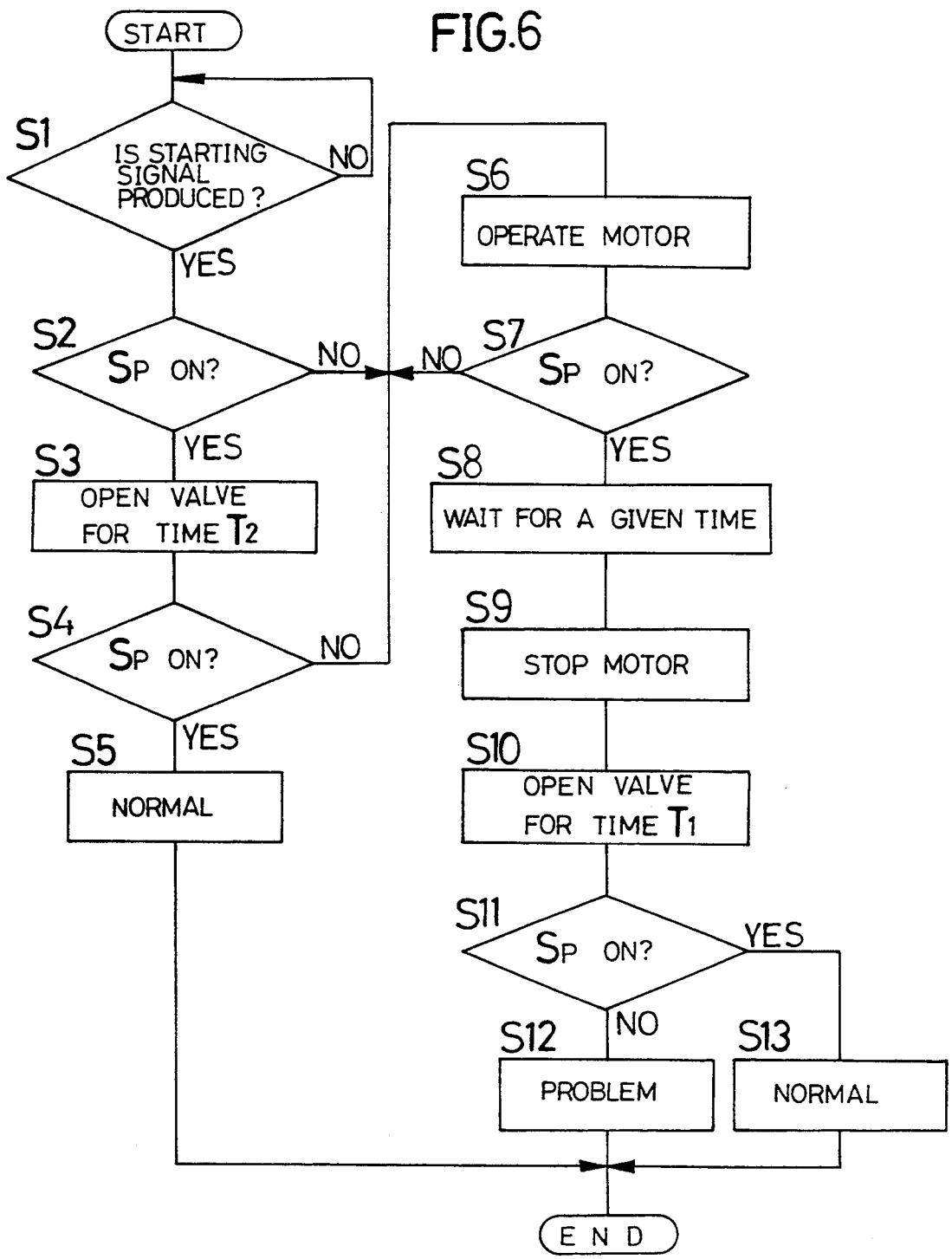

A control procedure by the problem diagnosis section $C_B$ constructed in the above manner is now be described below with reference to FIG. 6.

At a first step S1, it is decided whether or not at least one of the key switch 44 and the trouble diagnosis switch 46 has been turned ON so as to permit the high level signal to be produced from at least one of the starting-signal generating means 40 and 41. If the starting signal has been generated, then it is decided at a second step S2 whether or not the pressure detector $S_p$ is ON. If the starting signal has been generated and the pressure detector $S_p$ is ON, a high level signal is then produced from the AND gate 54, and in response thereto, a high level signal sustained only for the second predetermined time $T_2$ is produced from the second energizing means 52 at a third step S3; thereby, allowing the normally-closed type solenoid valve $V_c$ to be opened for the second predetermined time $T_2$. At a subsequent fourth step S4, it is decided whether or not the pressure detector $S_p$ is ON. If it has been decided that the pressure detector $S_p$ is ON, then it is decided at a fifth step S5 that the accumulator AC is normal.

When it has been decided at the second and fourth steps S2 and S4 that the pressure detector $S_p$ is in its OFF state, the processing is advanced to a sixth step S6 at which time the operation of the motor M is started in response to the starting signal from the drive control means 50; thereby, starting the accumulation in the accumulator AC by the pump P. After it has been decided at a seventh step S7 that the pressure detector $S_p$ has been turned ON, the operations of the motor M and the pump P are continued at an eighth step S8 until the given time (e.g., 1,000 m sec.) set in the drive control means 50 has lapsed. At a ninth step S9, the operations of the motor M and the pump P are stopped in response to the output of the drive stopping signal from the drive control means 50.

At a tenth step S10, a high level signal sustained only for the first predetermined time $T_1$ is produced from the first energizing means 51, and in response thereto, the normally-closed type solenoid valve $V_c$ is opened for the first predetermined time $T_1$. Then, it is decided at an eleventh step S11 whether or not the pressure detector $S_p$ is in its ON state. If the pressure detector $S_p$ is in its OFF state, then the alarm means 49 is operated so as to provide an alarm at a twelfth step S12 on the basis of the decision that the accumulator AC has a problem. If it has been decided that the pressure detector $S_p$ is in its ON state, then it is decided at a thirteenth step S13 that the accumulator AC is normal.

The operation of the first embodiment is now described hereinafter. In the problem diagnosis section $C_B$ in the control unit $C_B$, the motor M and thus the pump P are operated by the drive control means 50 in response to a turning OFF of the pressure detector $S_p$; thereby, allowing the normally-closed type solenoid valve $V_c$ to be opened for the first predetermined time $T_1$ by the first energizing means 51 in order to release the pressure in the accumulator AC after the pressure in the accumulator AC has become equal to or more than the second predetermined pressure $P_2$. Moreover, since the first predetermined time $T_1$ is set shorter than the time T taken for reducing the pressure in the accumulator AC, which is normal, from a predetermined pressure equal to or more than the second predetermined pressure $P_2$ down to the first predetermined pressure $P_1$ in response to an opening of the normally-closed type solenoid valve $V_c$, it is possible to decide that the accumulator AC has a problem when the pressure in the accumulator AC has become equal to or less than the first predetermined pressure $P_1$ as a result of an opening of the normally-closed type solenoid valve $V_c$ for the first predetermined time $T_1$. This ensures a reliable decision for determining that the accumulator AC has a problem.

Moreover, as described above, the normally-closed type solenoid valve $V_c$ is opened for the second predetermined time $T_2$ by the second energizing means 52 in response to the generation of the starting signal from the starting-signal generating means 40, 41 in response to the manual operation of the key switch 44 or the problem diagnosis switch 46; thereby, releasing the pressure in the accumulator AC. The second predetermined time $T_2$ is set shorter than the elapsed time T for reducing the pressure in the accumulator AC, which is normal, from the predetermined pressure equal to or more than the second predetermined pressure $P_2$ to the first predetermined pressure $P_1$ in response to an opening of the normally-closed type solenoid valve $V_c$. Therefore, as a result of the opening of the normally-closed type solenoid valve $V_c$ for the second predetermined time $T_2$, the pressure in the accumulator AC, if the latter is normal, may not be reduced to the first predetermined pressure $P_1$ in some cases. However, if the accumulator AC has a problem, the pressure in the accumulator AC is reliably reduced down to the first predetermined pressure $P_1$ or less, and the drive control means 50 and the first energizing means 51 are operated in response thereto; thereby, permitting the decision of the problem of the accumulator AC to be automatically carried out in the deciding means 53. This ensures that the diagnosis of the problem of the accumulator AC can be carried out at every start of the engine by an operation of the key switch and at any time by the trouble diagnosis switch 46.

When the pressure detector $S_p$ is in its OFF state, the function of the AND gate 54 ensures that the second energizing means 52 cannot produce a high level signal even if the starting signal is produced from the starting-signal generating means 40, 41. This makes it possible to avoid any unnecessary opening of the normally-closed type solenoid valve $V_c$ and to prevent a wasteful consumption of the working fluid due to the opening of the normally-closed type solenoid valve $V_c$ during the operation of the pump P.

Further, the function of the AND gate 55 ensures that the first energizing means 51 is inactivated at a time other than at a time of completion of the energization and opening of the normally-closed type solenoid valve $V_c$ when a starting signal from the starting-signal generating means 40, 41 is generated or at a time other than after attendant on the generation of the starting signal from the starting-signal generating means 40, 41. Accordingly, it is possible to avoid any unnecessary opening of the normally-closed type solenoid valve $V_c$. In other words, the release of pressure in the accumulator AC by the opening of the normally-closed type solenoid valve $V_c$ is a wasteful consumption of pressure, and the opening of the normally-closed type solenoid valve $V_c$ at the time other than during the anti-lock control must be avoided.

Moreover, in the accumulator AC, the loss in friction between the cylinder 23 and the piston 24 is relatively large. In such an accumulator AC, the effect in the accumulator chamber 25 due to a small variation in pressure is low, and a method, as described above, is particularly effective. This method includes, first, reducing the pressure in the accumulator AC to a level equal to or less than the first predetermined pressure $P_1$ and accumulating the pressure to a level equal to or more than the second predetermined pressure $P_2$ and thereafter, again releasing the pressure for deciding on the existence of a problem.

Figure 5:
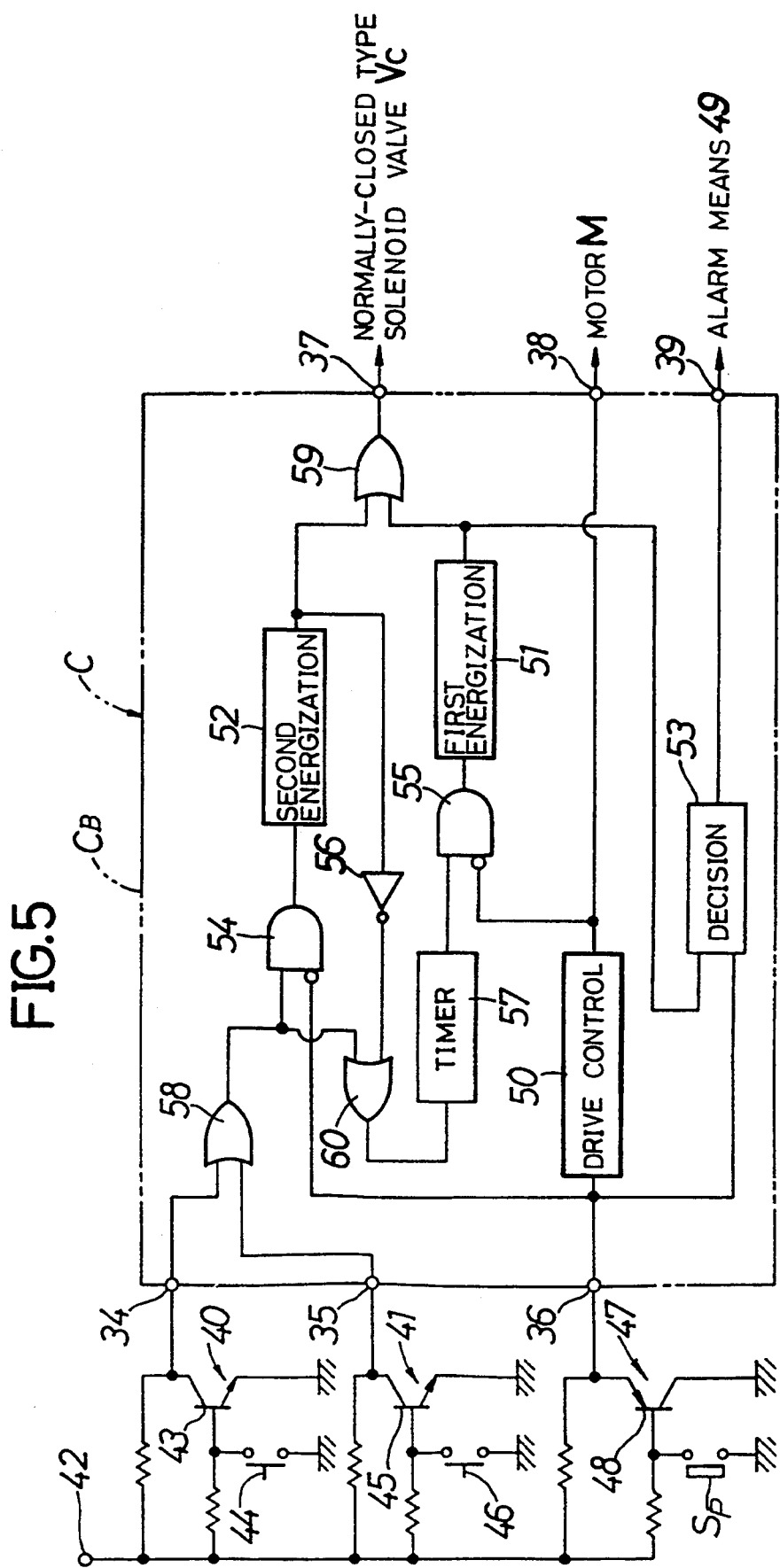
Figure 7:
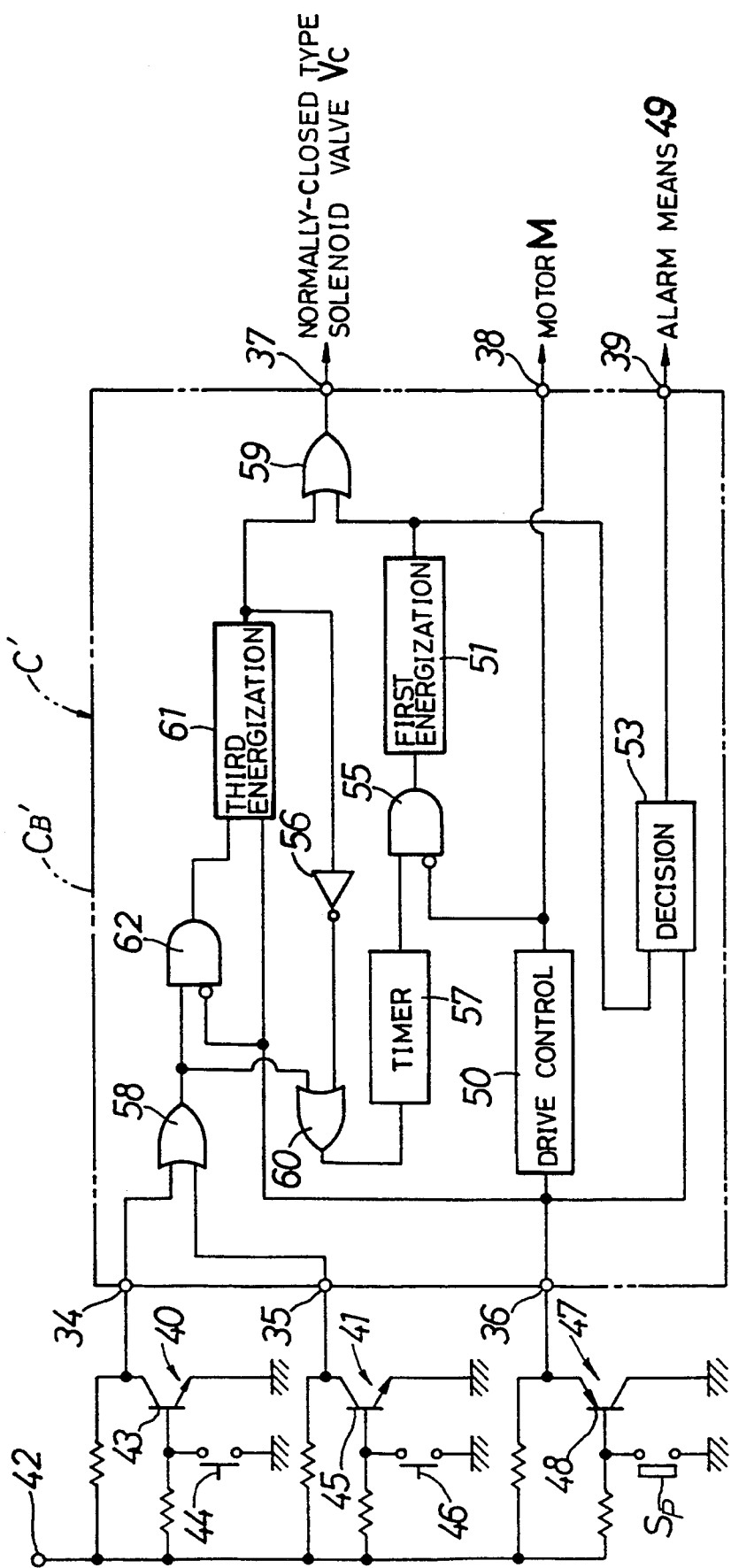
FIG. 7 is a circuit diagram similar to FIG. 5, but illustrating a second embodiment of the present invention.

FIG. 7 is a circuit diagram similar to FIG. 5, but illustrating a second embodiment of the present invention, wherein parts corresponding to those in the previously described embodiment are designated by like reference characters.

A problem diagnosis section $C_B'$ in a control unit C' includes a third energizing means 61 substituted for the second energizing means 52 in the previous embodiment, and an AND gate 62 as a third inactivating means substituted for the AND gate 54.

The third energizing means 61 is a flip-flop for energizing the normally-closed type solenoid valve $V_c$ until the pressure detector $S_p$ is turned OFF in response to the operation of the starting-signal generating means 40, 41 for generating the starting signal in response to the manual operation. The AND gate 62 is adapted to inactivate the third energizing means 61 when the pressure detector $S_p$ is in its OFF state at the time of generation of the starting signal from the starting-signal generating means 40, 41. An output signal from the OR gate 58 is applied to the AND gate 62, while a signal from the input terminal 36 is applied in an inversed manner to the AND gate 62, and the AND gate 62 and the input terminal 36 are connected to the third energizing means 61.

With the second embodiment, an effect similar to that in the previous first embodiment can be provided, and when the pressure detector $S_p$ is in its ON state at the time of generating the starting signal, the normally-closed type solenoid valve $V_c$ is opened until the pressure in the accumulator AC becomes equal to or less than the first predetermined pressure $P_1$; thereby, enabling the diagnosis of the problem in the accumulator AC to be carried out at any time or automatically.

FIGS. 8 to 12 illustrate a third embodiment of the present invention. FIG. 8 is a diagram of a hydraulic system for a brake device for an automobile; FIG. 9 is a diagram illustrating the arrangement of a control unit; FIG. 10 is a circuit diagram illustrating the arrangement of a problem diagnosis section in the control unit; and FIGS. 11 and 12 are flow charts illustrating a problem deciding procedure.

Referring to FIG. 8, left and right front wheel brakes $B_{FL}$ and $B_{FR}$ are mounted on left and right front wheels of an automobile, respectively, while left and right rear wheel brakes $B_{RL}$ and $B_{RR}$ are mounted on left and right rear wheels. Each of the brakes $B_{FL}$, $B_{FR}$, $B_{RL}$ and $B_{RR}$ includes a brake cylinder 71, and a brake piston 72 slidably received in the brake cylinder 71, and exhibits a braking force in accordance with an application of a hydraulic braking pressure to a braking fluid chamber 73 defined between the brake cylinder 71 and the brake piston 72. A brake pedal 1 is operatively connected to a tandem type master cylinder $MC_T$ which is capable of delivering a hydraulic braking pressure corresponding to the amount of brake pedal 1 depressed from a pair of output ports 75a and 75b. One of the output ports 75a is connected to the braking fluid chamber 73 in the left front wheel brake $B_{FL}$ through a left front wheel brake modulator $2_{FL}$ and also connected to the braking fluid chamber 73 in the right rear wheel brake $B_{RR}$ through a right rear wheel brake modulator $2_{RR}$. The other output port 75b is connected to the braking fluid chamber 73 in the right front wheel brake $B_{FR}$ through a right front wheel brake modulator $2_{FR}$ and also connected to the braking fluid chamber 73 in the left rear wheel brake $B_{RL}$ through a left rear wheel brake modulator $2_{RL}$.

Each of the modulators $2_{FL}$, $2_{FR}$, $2_{RL}$ and $2_{RR}$ has basically the same construction as the modulator 2 shown in the first embodiment and hence, components thereof are only shown with the use of the same reference characters as those of the modulator 2, and the detailed description thereof is omitted.

A pressure source PS′ is connected to an anti-lock control hydraulic pressure chamber 17 in the left front wheel brake modulator $2_{FL}$ through a normally-closed type solenoid valve $V_{CFL}$, and a fluid tank T is connected to such an anti-lock control hydraulic pressure chamber 17 through a normally-opened type solenoid valve $V_{OFL}$. The anti-lock control hydraulic pressure chamber 17 in the right front wheel brake modulator $2_{FL}$ is connected to the pressure source PS′ through the normally-closed type solenoid valve $V_{CFL}$ and to the fluid tank T through the normally-opened type solenoid valve $V_{OFL}$, while the anti-lock control hydraulic pressure chambers 17 in both the rear wheel brake modulators $2_{RL}$ and $2_{RR}$ are connected to the pressure source PS′ through a common normally-closed type solenoid valve $V_{CR}$ and to the fluid tank T through a common normally-opened type solenoid valve $V_{OR}$. Moreover, the normally-closed type solenoid valve $V_{CR}$ and the normally-opened type solenoid valve $V_{OR}$ common to the rear wheel brake modulators $2_{RL}$ and $2_{RR}$ are designed such that a flow area during opening thereof is larger as compared to the normally-closed type solenoid valves $V_{CFL}$ and $V_{CFR}$ and the normally-opened type solenoid valves $V_{OFL}$ and $V_{OFR}$ independently corresponding to the front wheel brake modulators $2_{FL}$ and $2_{FR}$.

The pressure source PS′ includes a fixed-displacement pump P connected to a motor M for pumping a working fluid from the fluid tank T, an accumulator AC connected to the pump P, a pressure detector $S_p$ for detecting the pressure in the accumulator AC, and a relief valve $V_L$ provided between an inlet and an outlet of the pump P.

The operation of the pump P; i.e., the motor M and the opening and closing operations of the normally-closed type solenoid valves $V_{CFL}$, $V_{CFR}$ and $V_{CR}$, and the normally-opened type solenoid valves $V_{OFL}$, $V_{OFR}$ and $V_{OR}$ are controlled by a control unit C″ to which is connected a back-up power source BB capable of supplying an electric power regardless of the operational condition of the engine mounted in an automobile. Connected to the control unit C″ are wheel speed sensors $S_{VFL}$, $S_{VFR}$, $S_{VRL}$ and $S_{VRR}$ independently corresponding to left and right front and rear wheels for detecting the wheel speeds, and the pressure detector $S_p$.

Referring to FIG. 9, the control unit C″ includes an anti-lock control section $C_A″$ for controlling the braking pressure of each of the wheel brakes $B_{FL}$, $B_{FR}$, $B_{RL}$ and $B_{RR}$, and a problem diagnosis section $C_B″$ for diagnosing the problem of the accumulator AC and the leakage in the normally-closed type solenoid valve $V_{CR}$.

The anti-lock control section $C_A″$ includes input terminals 76 to 79 for independently receiving the wheel speeds detected in the wheel speed sensors $S_{VFL}$, $S_{VFR}$, $S_{VRL}$ and $S_{VRR}$, an input terminal 80 for receiving an anti-lock control prohibiting signal from the trouble diagnosis section $C_B″$, an output terminal 81 for outputting a signal indicative of a command to energize and open the normally-closed type solenoid valve $V_{CFL}$ corresponding to the left front wheel brake modulator $2_{FL}$, an output terminal 82 for outputting a signal indicative of a command to energize and close the normally-opened type solenoid valve $V_{OFL}$ corresponding to the left front wheel brake modulator $2_{FL}$, an output terminal 83 for outputting a signal indicative of a command to energize and open the normally-closed type solenoid valve $V_{CFR}$ corresponding to the right front wheel brake modulator $2_{FR}$, an output terminal 84 for outputting a signal indicative of a command to energize and close the normally-opened type solenoid valve $V_{OFR}$ corresponding to the right front wheel brake modulator $2_{FR}$, an output terminal 85 for outputting a signal indicative of a command to energize and open the normally-closed type solenoid valves $V_{CR}$ corresponding to both the rear wheel brake modulators $2_{RL}$ and $2_{RR}$, an output terminal 86 for outputting a signal indicative of a command to energize and close the normally-opened type solenoid valves $V_{OR}$ corresponding to both the rear wheel brake modulators $2_{RL}$ and $2_{RR}$, and an output terminal 87 for outputting a high level signal when both of the left front wheel brake $B_{FL}$ and the right front wheel brake $B_{FR}$ are being anti-lock-controlled.

In the anti-lock control section $C_a''$, it is decided whether or not there is a possibility of a locking of each wheel on the basis of the wheel speed of the wheel, and a signal corresponding to such decision is outputted from a corresponding one of the output terminals 81 to 87. For example, when any of the wheels are not likely to become locked during braking, a low level signal is produced from each of the output terminals 81 and 87 and hence, the normally-closed type solenoid valves $V_{CFL}$, $V_{CFR}$ and $V_{CR}$ are in their deenergized and closed states, and the normally-opened type solenoid valves $V_{OFL}$, $V_{OFR}$ and $V_{OR}$ are in their deenergized and opened states. In this condition, the anti-lock control hydraulic pressure chamber 17 in each of the modulators $2_{FL}$ to $2_{RR}$ is opened to the fluid tank T. Thus, if the brake pedal 1 is depressed to permit a hydraulic pressure to be supplied from the master cylinder $MC_T$ into the primary hydraulic braking pressure chamber 15, the volume of the secondary hydraulic braking pressure chamber 16 is decreased, and a hydraulic braking pressure corresponding to the hydraulic pressure from the master cylinder $MC_T$ is supplied to the braking fluid chamber 73 in each of the wheel brakes $B_{FL}$ to $B_{RR}$. This accordingly ensures that the torque during braking can be freely increased or decreased depending upon the braking operation of a driver.

When a wheel is about to become locked, any of the normally-closed type solenoid valves $V_{CFL}$, $V_{CFR}$ and $V_{CR}$ corresponding to the wheel about to become locked is energized and opened, while any of the normally-opened type solenoid valves $V_{OFL}$, $V_{OFR}$ and $V_{OR}$ corresponding to the wheel about to become locked is energized and closed. In doing so, a hydraulic pressure is supplied from the accumulator AC to the anti-lock control hydraulic pressure chamber 17 in any of the modulators $2_{FL}$, $2_{FR}$, $2_{RL}$ and $2_{RR}$ corresponding to the wheel about to become locked- Therefore, notwithstanding the hydraulic pressure from the master cylinder $MC_T$ being applied to the primary hydraulic braking pressure chamber 15, the volume of the secondary hydraulic braking pressure chamber 16 is increased, and the hydraulic pressure in the braking fluid chamber 73 in any of the wheel brakes $B_{FL}$, $B_{FR}$, $B_{RL}$ and $B_{RR}$ corresponding to the wheel about to become locked is reduced in order to decrease the braking torque; thus, the wheel is prevented from entering into a lock state.

Further, the anti-lock control section $C_A''$ is arranged such that the anti,lock control is prohibited on the basis of the decision that there is a venting of gas occurring in the accumulator AC in the pressure source PS' or that there is a leakage occurring in the normally-closed type solenoid valve $V_{CR}$.

The trouble diagnosis section $C_B''$ in the control unit C" includes an input terminal 88 connected to a starting-signal generating means 40 for outputting a high level signal, for example, by turning ON a key switch for starting the engine of the vehicle, an input terminal 89 connected to a pressure signal generating means 47 adapted to output a low level signal in response to a turning-ON of the pressure detector $S_p$ and to output a high level signal in response to a turning-OFF of the pressure detector $S_p$, and an input terminal 90 connected to the output terminal 87 of the anti-lock control section $C_A''$. Further, the problem diagnosis section $C_B''$ includes an output terminal 91 for outputting a signal indicative of a command to control the operation of the normally-closed type solenoid valve $V_{CFL}$, an output terminal 92 for outputting a signal indicative of a command to control the operation of the normally-closed type solenoid valve $V_{CR}$, an output terminal 93 for outputting a signal indicative of a command to control the operation of the motor M, and an output terminal 94 connected to an alarm means 49 (such as, an alarm lamp) and to the input terminal 80 of the anti-lock control section $C_A''$.

The output terminal 81 of the anti-lock control section $C_A''$ and the output terminal 91 of the trouble diagnosis section $C_B''$ are connected in parallel to an OR gate 96 which is connected to the normally-closed type solenoid valve $V_{CFL}$. Further, the output terminal 85 of the anti-lock control section $C_A''$ and the output terminal 92 of the trouble diagnosis section $C_B''$ are connected in parallel to an OR gate 97 which is connected to the normally-closed type solenoid valve $V_{CR}$. Thus, when at least one of the output terminals 81 and 91 outputs a high level signal, the normally-closed type solenoid valve $V_{CFL}$ is energized and opened. When at least one of the output terminals 85 and 92 outputs a high level signal, the normally-closed type solenoid valve $V_{CR}$ is energized and opened.

In reference to FIG. 10, the trouble diagnosis section $C_B''$ includes a drive control means 50' adapted to output a starting signal indicative of a command to operate the pump P in response to the detection pressure detected in the pressure detector $S_p$ becoming equal to or less than the first predetermined pressure $P_1$ and to output a drive stopping signal indicative of a command to stop the operation of the pump P in response to the detection pressure becoming equal to or more than the second predetermined pressure $P_2$; a second energizing means 52' adapted to output for the second predetermined time $T_2$ a high level signal indicative of a command to energize the normally-closed type solenoid valves $V_{CFL}$ and $V_{CR}$ in response to generation of the starting signal from the starting-signal generating means 40; and a storage means 98 adapted to store the fact that the detection pressure detected in the pressure detector $S_p$ has become equal to or less than the first predetermined pressure $P_1$ in response to energization of the normally-closed type solenoid valves $V_{CFL}$ and $V_{CR}$ by the second energizing means 52' and to output a storage signal indicative of the storage of such fact. The trouble diagnosis section $C_B''$ further includes a first energizing means 51' adapted to produce a high level signal to energize the normally-closed type solenoid valve $V_{CR}$ for the first predetermined time $T_1$ after outputting of the drive stopping signal from the drive control means 50' when the storage signal is produced from the storage means 98; and a decision means 53' for deciding whether there is a venting of gas occurring in the accumulator AC or a leakage occurring in the normally-closed type solenoid valve $V_{CR}$ in accordance with the time from an instant when the detection pressure detected in the pressure detector $S_p$ becomes equal to or less than the first predetermined pressure $P_1$ after the completion of the energization of the normally-closed type solenoid valve $V_{CR}$ to a time when the detection pressure becomes equal to or more than the second predetermined pressure $P_2$ after the operation of the pump P is started by the drive control means 50'. The trouble diagnosis section $C_B''$ further includes a memory 99 adapted to store the decision of the venting of gas occurring in the accumulator AC or the leakage occurring in the normally-closed type solenoid valve $V_{CR}$ in response to such a decision by the decision means 53' and to produce a command signal for commanding the prohibition of the anti-lock control as well as the alarming operation of the alarm means 49 while the storing state is being sustained; an AND gate 100 adapted to inactivate the second energizing means 52' when the detection pressure detected in the pressure detector $S_p$ is equal to or less than the first predetermined pressure $P_1$ at the time of generation of the starting signal from the starting-signal generating means 40; and an AND gate 101 adapted to stop the outputting of the storage signal if such a storage signal is outputted from the storage means 98 in a condition whereby the energization of the normally-closed type solenoid valves $V_{CFL}$ and $V_{CR}$ by the second energizing means 52' or the energization of the normally-closed type solenoid valve $V_{CR}$ by the first energizing means 51' has been completed, and whereby the detection pressure detected in the pressure detector $S_p$ exceeds the first predetermined pressure $P_1$.

The drive control means 50' is formed as an off-delay timer. The input terminal 89 is connected to an input end of the drive control means 50' having an output end which is connected to an input end of the OR gate 102 in parallel to the input terminal 90. An output end of the OR gate 102 is connected to the output terminal 93. The drive control means 50' is adapted to produce a high level driving signal as soon as a high level signal is inputted from the pressure signal generating means 47 to the input terminal 89 in response to the pressure in the accumulator AC becoming equal to or less than the first predetermined pressure $P_1$, and to produce a low level signal as a drive stopping signal after a lapse of a given delay time (e.g., 1,000 m sec) from an instant when a low level signal is inputted from the pressure signal generating means 47 to the input terminal 89 in response to the pressure in the accumulator AC becoming equal to or more than the second predetermined pressure $P_2$.

The delay time (e.g., 1,000 m sec) set in the drive control means 50' is determined such that the pressure in the accumulator chamber 25 during stoppage of the operation of the fixed displacement pump P is less than a third predetermined pressure $P_3$. The third predetermined pressure $P_3$ is set higher than the second predetermined pressure $P_2$, as shown in FIGS. 3 and 4. Moreover, the relief valve $V_L$ provided in the pressure source PS' is designed to be opened in response to the pressure accumulated in the accumulator chamber 25 becoming equal to or more than the third predetermined pressure $P_3$.

In this manner, a high level driving signal indicative of a command to operate the pump P and thus, the motor M when the anti-lock control is being conducted, is continuously delivered from the OR gate 102 (i.e., the output terminal 93). During this time, when the pressure in the accumulator chamber 25 in the accumulator AC becomes equal to or more than the third predetermined pressure $P_3$, the relief valve $V_L$ is opened to permit a surplus working fluid to be returned to the fluid tank T. When the anti-lock control is not conducted, a driving signal is delivered from the OR gate (i.e., the output terminal 93) which driving signal goes to a high level when the detection pressure detected in the pressure detector $S_p$ becomes equal to or less than the first predetermined pressure $P_1$. The high level of the driving signal is sustained until a given delay time lapses from an instant when the detection pressure becomes equal to or more than the second predetermined pressure $P_2$. During this time, the pressure in the accumulator chamber 25 cannot be increased to a level equal to or more than the third predetermined pressure $P_3$ by the operation of the motor M (i.e., the pump P).

The second energizing means 52' includes a first energizing-signal generating circuit 104 which is a monostable circuit and adapted to produce a high level signal sustained for the second predetermined time $T_2$ in response to a reception of a high level signal thereinto, and a second energizing-signal generating circuit 105 which is also a monostable circuit and adapted to produce a high level signal sustained for the second predetermined time $T_2$ in response to a reception of a high level signal thereinto. An output end of the first energizing-signal generating circuit 104 is connected to the output end 91, while an output terminal of the second energizing-signal generating circuit 105 and the output end of the first energizing means 51' are connected to an input terminal of an OR gate 106 in parallel. The OR gate 106 is connected to the output terminal 92. Thus, when the high level signal is outputted from the first energizing-signal generating circuit 104, the normally-closed type solenoid valve $V_{CFL}$ is energized and opened. When the high level signal is outputted from the second energizing-signal generating circuit 105, the normally-closed type solenoid valve $V_{CR}$ is energized and opened. Moreover, the flow area of the normally-closed type solenoid valve $V_{CR}$ during opening thereof is larger than the flow area of the normally-closed type solenoid valve $V_{CFL}$ during opening thereof, and the durations of the high level signals from the energizing-signal generating circuits 104 and 105 are the second predetermined time $T_2$ and are similar. Therefore, the amount of working fluid released from the accumulator AC as a result of the opening of the normally-closed type solenoid valve $V_{CR}$ by the second energizing-signal generating circuit 105 is larger than the amount of working fluid released from the accumulator AC as a result of the opening of the normally-closed type solenoid valve $V_{CFL}$ by the first energizing-signal generating circuit 104.

The second predetermined time $T_2$ is set at a value (e.g., 300 m sec) shorter than the elapsed time T for the reduction of the pressure in the accumulator AC from a predetermined pressure equal to or more than the second predetermined pressure down to the first predetermined pressure $P_1$ in response to the opening of the normally-closed type solenoid valves $V_{CFL}$ and $V_{CR}$ with the accumulator AC being in its normal state (i.e., the state as shown in curve A in FIG. 3).

The starting signal from the input terminal 88 is applied to the input end of the AND gate 100, and the pressure signal from the input terminal 89 is also applied in an inverted manner to the input end of the AND gate 100. Therefore, the AND gate 100 produces a high level signal only when a high level signal is received thereinto from the starting-signal generating means 40 in a condition in which the detection pressure detected in the pressure detector $S_p$ is not equal to or less than the first predetermined pressure $P_1$.

An output signal from the AND gate 100 is applied to AND gates 107 and 108, and an output signal from the storage means 98 is applied to one of the AND gates 107 in an inverted manner and to the other AND gate 108. Output signals from the AND gates 107 and 108 are applied to the first and second energizing-signal generating circuits 104 and 105 in the second energizing means 52′, respectively.

Thus, the first energizing-signal generating circuit 104 generates an energizing signal for the second predetermined time $T_2$ in a condition in which the outputting of a high level storage signal from the storage means 98 has been stopped upon reception of the high level signal from the starting-signal generating means 40 when the pressure in the accumulator AC is not equal to or less than the first predetermined pressure. The second energizing-signal generating circuit 105 delivers an energizing signal for the second predetermined time $T_2$ in a condition in which a high level storage signal has been outputted from the storage means 98 upon reception of the high level signal from the starting-signal generating means 40 when the pressure in the accumulator AC is not equal to or less than the first predetermined pressure.

The storage means 98 is a flip-flop which outputs a high level storage signal in response to a reception of a high level signal from an AND gate 109 and is reset in response to a reception of a high level reset signal from the AND gate 101.

An output signal from the first energizing-signal generating circuit 104 in the second energizing means 52′ is inverted in an inverter 110 and applied to the AND gate 109, and a pressure signal received into the input terminal 89 is applied to the AND gate 109. A high level signal is delivered from the AND gate 109 to the storage means 98 when an output signal from the pressure detector $S_p$ is of a high level; i.e., the pressure in the accumulator AC is equal to or less than the first predetermined pressure $P_1$ upon the completion of rising o of an output-signal from the inverter and upon the completion of energization of the normally-closed type solenoid valve $C_{CFL}$ by the first energizing-signal generating circuit 104. Thus, the storage means 98 stores the fact that the detection pressure detected in the pressure detector $S_p$ has become equal to or less than the first predetermined pressure $P_1$ in response to energization of the normally-closed type solenoid valve $V_{CFL}$ by the first energizing-signal generating circuit 104 in the second energizing means 52′, and the storage means 98 produces a high level storage signal indicative of the storage of such fact.

The first energizing means 51′ is a monostable circuit which produces a high level energizing signal sustained for the first predetermined time $T_1$ in response to a reception of a high level signal from an AND gate 111. The output signal from the first energizing means 51′ is connected to the output terminal 92 through the OR gate 106; and thus, the normally-closed type solenoid valve $V_{CR}$ is energized and opened for the first predetermined time $T_1$ by the first energizing means 51′.

The first predetermined time $T_1$ is set at a value (e.g., 300 m sec) shorter than the time T taken for reducing the pressure in the accumulator AC from the predetermined level equal to or more than the second predetermined pressure $P_2$ to the first predetermined pressure $P_1$ with the accumulator AC being in its normal state (i.e., the state as shown in curve A in FIG. 3).

An output signal form the storage means 98 is inputted into the AND gate 1211, and an output signal from the drive control means 50′ is inputted into the AND gate 111 in an inverted manner. Further, an output signal from a timer 112 is inputted into the AND gate 111. Thus, the AND gate 111 delivers a high level signal to the first energizing means 50′ when the output signal from the drive control means 50′ is changed from a high level to a low level; i.e., when the operation of the motor M is stopped in a condition wherein a high level signal sustained for a given time is produced from the timer 112 upon the outputting of a high level storage signal from the storage means 98.

A signal from an OR gate 113 is inputted into the timer 112. Output signals from the first and second energizing-signal generating circuits 104 and 105 are inverted in inverters 110 and 114, and inputted into the timer 112, and a signal from the input terminal 88 is inputted into the 0R gate 113. Thus, a high level signal is delivered from the 0R gate 113 when a high level starting signal is inputted from the starting-signal generating means 40 or in response to a fall of at least one of the output signals from the first and second energizing-signal generating circuits 104 and 105 (i.e., in response to the completion of opening of the normally-closed type solenoid valve $V_{CFL}$ or $V_{CR}$ upon the reception of the starting signal). The timer 112 produces a high level signal sustained for a given time after the reception of the high level signal. Such a given time set in the timer 112 is determined at about a value required for increasing the pressure in the accumulator AC from the first predetermined pressure $P_1$ to the second predetermined pressure $P_2$ by the operation of the pump P when the accumulator AC is in its normal state.

A signal from the input terminal 89 is inputted into the AND gate 101 in an inverted manner, and an output signal from an OR gate 115 is inputted into the AND gate 101. An output signal from the first energizing-signal generating circuit 104 in the second energizing means 52′ and an output signal from the first energizing means 51′ are inadvertently inputted into the OR gate 115. Thus, when the completion of the energization of the normally-closed type solenoid valve $V_{CFL}$ by the first energizing-signal generating circuit 104 in the second energizing means 52′ is completed, or when the energization of the normally-closed type solenoid valve $V_{CR}$ is completed, if the pressure in the accumulator AC is not equal to or less than the first predetermined pressure $P_1$, then a high level reset signal is outputted from the AND gate 101; thereby, resetting the storage means 98.

A signal from the input terminal 89, a signal from the drive control means 50′ and an output signal from the first energizing means 51′ are inputted into the deciding means 53′, and an output signal from the deciding means 53′ is applied to the memory 99. The deciding means 53′ counts the time from an instant when the pressure in the accumulator AC has become equal to or less than the first predetermined pressure $P_1$ in order to permit the driving signal to be delivered from the drive control means 50′ when the output signal from the first energizing means 51′ has been changed from the high level to the low level (i.e., when the energization of the normally-closed type solenoid valve $V_{CR}$ by the first energizing means 51′ has been completed) to an instant when the pressure in the accumulator AC reaches a level equal to or more than the second predetermined pressure $P_2$. If such time is less than a defined time, the deciding means 53′ decides that there is a venting of gas occurring in the accumulator AC, and if such time is equal to more than the defined time, the deciding means 53′ decides that there is a leakage occurring in the normally-closed type solenoid valve $V_{CR}$. The defined time is set shorter than the time corresponding to the width $W_A$, as shown in FIG. 3, when the accumulator AC is normal. If there is a venting of gas produced in the accumulator AC, the pressure in the accumulator AC is increased from the first predetermined pressure $P_1$ up to a level equal to or more than the second predetermined pressure $P_2$ for a shorter time than that when the accumulator AC is normal. Accordingly, it is possible to decide the existence of a venting of gas produced in the accumulator AC. On the other hand, if there is a leakage produced in the normally-closed type solenoid valve $V_{CR}$, the working fluid from the pump P is leaked through the normally-closed type solenoid valve $V_{CR}$ to the fluid tank T and therefore, it is possible to decide that there is a leakage produced in the normally-closed type solenoid valve $V_{CR}$ on the basis of the fact that the pressure in the accumulator AC would not become equal to or more than the second predetermined pressure $P_2$ even in a relatively long time.

Signals corresponding to the facts that there is a venting of gas occurring in the accumulator AC and that there is a leakage occurring in the normally-closed type solenoid valve $V_{CR}$ are inputted from the deciding means 53' to the memory 99. The memory 99 stores the decision of the fact that there is the venting of gas occurring in the accumulator AC or the leakage occurring in the normally-closed type solenoid valve $V_{CR}$ in response to such a decision, and outputs a high level command signal while the storage is being sustained. Moreover, the memory 99 is such that it releases the storage in response to the disconnection of the control unit C'' and the back-up power source BB (see, FIG. 1) from each other when the venting of gas in the accumulator AC has been stored therein. Also, the memory 99 is such that it releases the storage in response to either the disconnection of the control unit C'' and the backup power source BB (see, FIG. 1) from each other or the stopping of the operation of the engine mounted in the automobile (i.e., in response to the output signal from the starting-signal generating means 40 becoming the low level) when the leakage in the normally-closed type solenoid valve $C_{CR}$ has been stored therein. Such a release of the storage causes the output signal to become the low level.

A procedure for the control by the problem diagnosis section $C_B''$ arranged in the above manner will be described below with reference to FIGS. 11 and 12. At the outset, at a first step SS1 in FIG. 11, it is decided whether or not a high level starting signal has been produced from the starting-signal generating means 40. If the starting signal has been produced, it is decided at a second step SS2 whether or not the pressure detector $S_p$ has been turned ON by the detection of the second predetermined pressure $P_2$, and a low level signal is produced by the pressure signal generating means 47. If the starting signal has been produced and the pressure detector $S_p$ has been turned ON, a high level signal is outputted from the AND gate 100 and in response thereto, it is decided at a third step SS3 whether or not a flag F is "1". The flag F indicates that the pressure in the accumulator AC has become equal to or less than the first predetermined pressure $P_1$ upon the outputting of a high level storage signal by the storage means 98, (i.e., in response to the energization of the normally-closed type solenoid valve $V_{CFL}$ by the first energizing-signal generating circuit 104 in the second energizing means 52'. If F=0, the processing is advanced to a fourth step SS4, and if F=1, the processing is advanced to an eight step SS8.

At the fourth step SS4, the normally-closed type solenoid valve $V_{CFL}$ is energized and opened by the outputting of an energizing signal sustained for the second predetermined time $T_2$ from the first energizing-signal generating circuit 104 in the second energizing means 52'. At a fifth step SS5, it is decided whether or not the pressure detector $S_p$ is ON. If it has been decided at the fifth step SS5 that the pressure detector $S_p$ is OFF (i.e., when the pressure in the accumulator AC has become equal to or less than the first predetermined pressure $P_1$), the motor M is operated at a sixth step SS6, and the flag F is set at "1" at a seventh step SS7, and progressing to a main routine for carrying out a procedure for providing an anti-lock control by the anti-lock control section $C_A''$. If it has been decided at the fifth step SS5 that the pressure detector $S_p$ is ON, the processing is advanced directly to the main routine bypassing the sixth and seventh steps SS6 and SS7.

At the eighth step SS8, the normally-closed type solenoid valve $V_{CR}$ is energized and opened by the outputting of an energizing signal sustained for the second predetermined time $T_2$ from the second energizing-signal generating circuit 105 in the second energizing means 52'. At a subsequent ninth step SS9, it is decided whether or not the pressure detector $S_p$ is ON. If it has been decided at the ninth step SS9 that the pressure detector $S_p$ is ON, the flag F is reset at a tenth step SS10, and progressing to the main routine.

If the pressure detector $S_p$ is OFF at both the second and ninth steps SS2 and SS9, the processing is advanced to an eleventh step SS11 where the operation of the motor M is started by the starting signal from the drive control means 50', and the accumulation in the accumulator AC by the pump P is started. After it is decided at a twelfth step SS12 that the pressure detector $S_p$ has been turned ON, the operations of the motor M and the pump P are continued at a thirteenth step SS13 until a delay time set in the drive control means 50' (e.g., 1,000 m sec) is lapsed. At a fourteenth step SS14, the operations of the motor M and, thus, the pump P are stopped.

At a fifteenth step SS15, a high level signal sustained for the first predetermined time $T_1$ is produced from the first energizing means 51' and in response thereto, the normally-closed type solenoid valve $V_{CR}$ is opened for the first predetermined time $T_1$. Then, it is decided at a sixteenth step SS16 whether or not the pressure detector $S_p$ is ON. If the pressure detector $S_p$ is ON, the flag F is reset at a seventeenth step SS17, and progressing to the main routine. If the pressure detector $S_p$ is OFF, the processing is advanced to an eighteenth step SS18.

At the eighteenth step SS18, it is decided whether there is a venting of gas occurring in the accumulator AC or a leakage occurring in the normally-closed type solenoid valve $V_{CR}$. More specifically, after the normally-closed type solenoid valve $V_{CR}$ is energized and opened by the first energizing means 51', the operation of the motor M and thus, the operation of the pump P are started by the drive control means 50' in response to the detection of the first predetermined pressure $P_1$ by the pressure detector $S_p$, and at the same time, the counting of the time in the deciding means 53' is started. Such a counting of the time is completed in response to the reception of a low level signal from the pressure signal generating means 47 as a result of the pressure in the accumulator AC being increased to a level equal to or more than the second predetermined pressure $P_2$ by the operation of the pump P. If the counted time is less than the defined time, it is decided that there is the venting of gas occurring in the accumulator AC. If the counted time is equal to or more than the defined time, it is decided that there is a leakage occurring in the normally-closed type solenoid valve $V_{CR}$.

The operation of the third embodiment is now described below. In the trouble diagnosis section $C_B''$ in the control unit $C''$, if the detection pressure detected in the pressure detector $S_p$ is not equal to or less than the first predetermined pressure $P_1$, then the normally-closed type solenoid valve $V_{CFL}$ or $V_{CR}$ is energized and opened for the first predetermined time by the second energizing means 52' in response to the generation of the starting signal from the starting-signal generating means 40 by the operation of the key switch; thereby, reducing the pressure in the accumulator AC to a level equal to or less than the first predetermined pressure $P_1$ so as to permit a high level signal to be produced from the pressure signal generating means 47. In response thereto, the motor M and thus, the pump P are operated by the drive control means 50', and the pressure in the accumulator AC is increased to a level equal to or more than the second predetermined pressure $P_2$ and thereafter, the normally-closed type solenoid valve $V_{CR}$ is opened for the first predetermined time $T_1$ by the first energizing means 51'; thereby, causing the pressure in the accumulator AC to be released. Moreover, the first and second predetermined times $T_1$ and $T_2$ are set shorter than the time T elapsed for reducing the pressure in the accumulator AC, which is normal, from the predetermined level equal to or more than the second predetermined pressure $P_2$ to the first predetermined pressure $P_1$ in response to the opening of the normally-closed type solenoid valve $V_{CFL}$, $V_{CR}$, as described above. Therefore, if the pressure in the accumulator AC is reduced to a level equal to or less than the first predetermined pressure $P_1$ by repeating the release of the pressure in the accumulator AC twice, then the pump P is operated once more; thereby, ensuring that it is possible to decide a venting of gas occurring in the accumulator AC or a leakage occurring in the normally-closed type solenoid valve $V_{CR}$ on the basis of the time elapsed for increasing the pressure in the accumulator AC to a level equal to or more than the second predetermined pressure $P_2$. If the detection pressure detected in the pressure detector $S_p$ is equal to or less than the first predetermined pressure $P_1$, there is a high possibility of a venting of gas produced in the accumulator AC or a leakage produced in the normally-closed type solenoid valve $V_{CR}$. In this case, the motor M and thus, the pump P are operated by the drive control means 50'; thereby, causing the pressure in the accumulator AC to be increased to a level equal to or more than the second predetermined pressure $P_2$. Then, the normally-closed type solenoid valve $V_{CR}$ is opened for the first predetermined time $T_1$ by the first energizing means 51' and thereafter, the pump P is operated once more, and the time elapsed for increasing the pressure in the accumulator AC to a level equal to or more than the second predetermined pressure $P_2$ is counted. On the basis of such a counted time, it is decided that there is the venting of gas occurring in the accumulator AC or the leakage occurring in the normally-closed type solenoid valve $V_{CR}$.

The release of the pressure from the accumulator AC is conducted twice in such a manner that the normally-closed type solenoid valve $V_{CR}$ is opened after the completion of the control of the operation of the motor M by the drive control means 50' only in a condition in which the pressure in the accumulator AC has been reduced to a level equal to or less than the first predetermined pressure $P_1$ upon the last or preceding generation of the starting signal; thereby, permitting the high level storage signal to be produced from the storage means 98. This condition ensures that a high accuracy diagnosis of the problem can be achieved when there is a high possibility of a venting of gas occurring in the accumulator AC or a leakage occurring in the normally-closed type solenoid valve $V_{CR}$. The pressure in the accumulator AC is reduced to a level equal to or less than the first predetermined pressure $P_1$ upon the current generation of the starting signal in a condition in which the pressure in the accumulator AC is not equal to or less than the first predetermined pressure $P_1$; and the high level signal is not produced from the storage means 98. This is due to the fact that there is a high possibility of the reduction of the pressure due to the repetition of the energization and opening of the normally-closed type solenoid valve $V_{CFL}$ by the first energizing-signal generating circuit 104 in the second energizing means 52'. Accordingly, the energization and opening of the normally-closed type solenoid valve $V_{CR}$ by the first energizing means 51' is not conducted; consequently, leading to an avoided wasteful operation of the normally-closed type solenoid valve $V_{CR}$. In this case, however, there is also a possibility of a venting of gas occurring in the accumulator AC or a leakage occurring in the normally-closed type solenoid valve $V_{CR}$ and hence, it is possible to provide for the next generation of the starting signal by the storage in the storage means 98.

The second energizing means 52' includes the first energizing-signal generating circuit 104 adapted to produce the energizing signal upon the generation of the starting signal with the high level storage signal not produced by the storage means 98, and the second energizing-signal generating circuit 105 adapted to produce the energizing signal upon the generation of the starting signal with the high level storage signal produced by the storage means 98. The amount of working fluid released from the accumulator AC during the energization by the second energizing-signal generating circuit 105. Therefore, if there is the slightest doubt in the venting of gas occurring in the accumulator AC or a leakage occurring in the normally-closed type solenoid valve $V_{CR}$ (i.e., if the normally-closed type solenoid valve $V_{CR}$ is energized by the second energizing-signal generating circuit 105), then the amount of fluid released can be increased to provide an accurate diagnosis.

The function of the AND gate 100 ensures that if the pressure in the accumulator AC is equal to or less than the first predetermined pressure $P_1$ and the output signal from the pressure signal generating means 47 is of the high level, then the first energizing means 52' cannot produce the high level signal even if the high level starting signal is generated from the starting-signal generating means 40. Therefore, it is possible to avoid any unnecessary opening of the normally-closed type solenoid valves $V_{CFL}$ and $V_{CR}$, and to prevent any wasteful consumption of the working fluid due to the opening of the normally-closed type solenoid valves $V_{CFL}$ and $V_{CR}$.

Further, the function of the AND gate 101 ensures that the pressure in the accumulator AC cannot be reduced down to a level equal to or less than the first predetermined pressure $P_1$ as a result of the energization and opening of the normally-closed type solenoid valves $V_{CFL}$ and $V_{CR}$, and when any doubt in the venting of gas occurring in the accumulator AC or a leakage occurring in the normally-closed type solenoid valve $V_{CR}$ is eliminated, the storage means 98 is reset to provide for the start of the next diagnosis from the initial step; thus, making it possible to suppress any unnecessary consumption of pressure.

The pump P is of a fixed displacement type, and the operations of the pump and thus, the motor M are controlled so that they are stopped after a lapse of the predetermined time from an instant when the pressure in the accumulator AC has become equal to or more than the second predetermined pressure $P_2$. This is advantageous in order to set the detection pressure detected by the pressure detector at a low value relative to the maximum pressure in the accumulator AC and to set a load and a detection hysteresis for the pressure detector AC.

The pressure source PS' is provided with the relief valve $V_L$ adapted to be opened in response to the pressure in the accumulator AC becoming equal to or more than the third predetermined pressure $P_3$. This is advantageous with respect to the pressure withstand strength of the pressure source PS' and it is thus possible to provide an increase in the degree of freedom of the control. More specifically, it is possible to provide a reduction in size of the accumulator AC in a manner such that the pump P is operated during consumption of the pressure in the pressure source PS' (i.e., during an anti-lock control). The relief valve $V_1$ generally has a relatively large hysteresis of opening and closing thereof, and once the relief valve $V_L$ is opened, the pressure in the accumulator AC may be reduced by a large amount; thereby, resulting in the fear of a reduction in accuracy of diagnosis of the problem due to the second releasing of the pressure by the first energizing means 51'. However, since the time from an instance when the pressure in the accumulator AC becomes equal to or more than the second predetermined pressure $P_2$ to an instance when the operations of the motor M and thus, the pump P are stopped is set such that the pressure in the accumulator AC at the stop of the operation of the pump P is less than the third predetermined pressure $P_3$, the relief valve $V_L$ cannot be opened during the diagnosis of the problem of the accumulator AC; thereby, making it possible to provide a more reliable diagnosis by the first energizing means 51'.

In this way, it is possible to distinctively decide whether or not there is venting of gas occurring in the accumulator AC or a leakage occurring in the normally-closed type solenoid valve $V_{CF}$, and to promptly carry out a post-treatment suited to the problem. Moreover, if there is venting of gas occurring in the accumulator AC, the alarm operation of the alarm means 49 is not terminated, unless the connection between the control unit C" and the back-up power source BB is released and a repair operation is carried out. On the other hand, if there is leakage occurring in the normally-closed type solenoid valve $V_{CR}$, there is even a possibility that the leakage is dissolved by opening the normally-closed type solenoid valve $V_{CR}$ and removing foreign matters caught between a valve member and a valve seat, and for this reason, the alarm operation of the alarm mans 49 is stopped at both times when the operation of the engine is stopped by turning OFF the key switch and when the connection between the control unit C" and the back-up power source BB is released. Therefore, if the leakage is dissolved when the engine is operated again, the alarming means 49 cannot be operated for alarming; thereby, leading to a saving of wasteful labor.

Although the normally-closed type solenoid valve $V_{CFL}$ is energized by the first energizing-signal generating circuit 104 in the above embodiments, it will be understood that the normally-closed type solenoid valve $V_{CFR}$ may be energized. In addition, the common normally-closed type solenoid valve may be energized by the first and second energizing-signal generating circuits 104 and 105, as well as the first energizing means 51', and the time of energization of the normally-closed type solenoid valve by the second energizing-signal generating circuit 105 may be set longer than the time of energization of the normally-closed type solenoid valve by the first energizing-signal generating circuit 104.

While the invention has been particularly shown and described in reference to preferred embodiments thereof, it will be understood by those skilled in the art that changes in form and details may be made therein without departing from the spirit and scope of the invention.

What is claimed is:

1. A problem diagnosis system in a pressure device control apparatus, comprising:

a pressure source including a pump for pumping a fluid from a fluid tank, an accumulator connected to the pump and a pressure device, and a pressure detector for detecting the pressure in the accumulator;

a normally-closed type solenoid valve interposed between the pressure device and the accumulator or the fluid tank; and a control unit including a drive control means for outputting a driving signal indicative of a command to operate the pump in response to a detection pressure detected in the pressure detector becoming equal to or less than a first predetermined pressure and for outputting a drive stopping signal indicative of a command to stop the operation of the pump in response to the detection pressure becoming equal to or more than a second predetermined pressure which is higher than the first predetermined pressure, wherein said control unit further comprises a first energizing means for energizing said normally-closed type solenoid valve for a first predetermined time after said drive control means outputs the drive stopping signal, and a deciding means, having inputs connected to said pressure detector and to an output of said first energizing means, for deciding that there is a problem in response to the detection pressure detected in the pressure detector becoming equal to or less than the first predetermined pressure after the energization of the normally-closed type solenoid valve by the first energizing means is completed, said first predetermined time being set shorter than a time to be elapsed for the pressure in the accumulator, when the accumulator is in normal operation, to be reduced from a predetermined pressure level equal to or more than the second predetermined pressure to the first predetermined pressure in response to an opening of said normally-closed type solenoid valve.

2. A problem diagnosis system in a pressure device control apparatus according to claim 1, wherein said control unit includes a second energizing means for energizing said normally-closed type solenoid valve for a second predetermined time in response to an operation of a starting-signal generating means for generating a starting signal in response to a manual operation, said second predetermined time being set shorter than the elapsed time for the pressure in the accumulator, when accumulator is in manual operation, to be reduced from the predetermined pressure level equal to or more than the second predetermined pressure to the first predetermined pressure in response to an opening of said normally-closed type solenoid valve.

3. A problem diagnosis system in a pressure device control apparatus according to claim 2, wherein said control unit includes a first inactivating means for inactivating said second energizing means when the detection pressure detected in said pressure detector is equal to or less than the first predetermined pressure at a time of generation of the starting signal from the starting-signal generating means.

4. A problem diagnosis system in a pressure device control apparatus according to claim 2, wherein said control unit includes a second inactivating means for inactivating the first energizing means at a time other than a period from an instant when the starting signal is produced to an instant when a first predetermined time has lapsed.

5. A problem diagnosis system in a pressure device control apparatus according to claim 2, wherein said accumulator is comprised of a displacing member carried in a housing and having opposite surfaces facing an accumulator chamber leading to the pump and a gas-charged chamber, respectively, wherein said control unit comprises a storage means for storing a fact that the detection pressure detected in the pressure detector has become equal to or less than the first predetermined pressure in response to the energization of the normally-closed type solenoid valve by the second energizing means and to output a storage signal indicating the storage of such fact, and wherein said first energizing means energizes said normally-closed type solenoid valve for the first predetermined time after an outputting of the drive stopping signal by said drive control means when the storage signal is outputted from said storage means.

6. A problem diagnosis system in a pressure device control apparatus according to claim 5, wherein said second energizing means comprises a first energizing-signal generating circuit for generating an energizing signal in a condition in which the output of the storage signal from said storage means has been stopped at a time of generation of the starting signal from said starting-signal generating means, and a second energizing-signal generating circuit for generating an energizing signal in a condition in which the storage signal has been outputted from said storage means at the time of generation of the starting signal from said starting-signal generating means, and the amount of working fluid released from said accumulator as a result of an opening of said normally-closed type solenoid valve by said second energizing-signal generating circuit is set larger than an amount of working fluid released from said accumulator as a result of an opening of said normally-closed type solenoid valve by said first energizing-signal generating circuit.

7. A problem diagnosis system in a pressure device control apparatus according to claim 6, wherein a time period for energization of the normally-closed type solenoid valve by said second energizing-signal generating circuit is set longer than a time period for energization or the normally-closed type solenoid valve by said first energizing-Signal generating circuit.

8. A problem diagnosis system in a pressure device control apparatus according to claim 6, wherein at least two solenoid valves are normally-closed type solenoid valves having different flow areas during opening thereof and are connected to said accumulator, said first energizing-signal generating circuit being connected to the normally-closed type solenoid valve having a smaller flow area during opening thereof, and said second energizing-signal generating circuit being connected to the normally-closed type solenoid valve having a larger flow area during opening thereof.

9. A problem diagnosis system in a pressure device control apparatus according to claim 5, wherein said control unit includes a reset means for stopping the outputting of the storage signal if said storage signal is produced by the storage means in a condition in which the detection pressure detected in the pressure detector exceeds the first predetermined pressure as a result of energization of the normally-closed type solenoid valve by the second energizing means.

10. A problem diagnosis system in a pressure device control apparatus according to claim 5, wherein said control unit includes a reset means for stopping the outputting of the storage signal if said storage signal produced by the storage means in a condition in which the detection pressure detected in the pressure detector exceeds the first predetermined pressure as a result of energization of the normally-closed type solenoid valve by the first energizing means.

11. A problem diagnosis system in a pressure device control apparatus according to claim 1, wherein said control unit includes a third energizing means for energizing said normally-closed type solenoid valve until the detection pressure detected in the pressure detector is reduced to a level equal to or less than the first predetermined pressure in response to an operation of a starting-signal generating means for generating a starting signal in response to a manual operation.

12. A problem diagnosis system in a pressure device control apparatus according to claim 11, wherein said control unit includes a third inactivating means for inactivating the third energizing means when the detection pressure detected in the pressure detector is equal to or less than the first predetermined pressure at a time of generation of the starting signal from said starting-signal generating means.

13. A problem diagnosis system in a pressure device control apparatus according to claim 1, wherein said accumulator comprises a cylinder, a piston slidably received in said cylinder, an accumulator chamber connected to said pump and said pressure device, and a gas chamber charged with gas, said accumulator chamber and said gas chamber being provided in said cylinder with said piston interposed therebetween.

14. A problem diagnosis system in a pressure device control apparatus according to claim 1, wherein said pump is of a fixed displacement type, and said drive control means outputs the drive stopping signal after a lapse of a predetermined delay time from an instant when the detection pressure detected in the pressure detector becomes equal to or more than the second predetermined pressure.

15. A problem diagnosis system in a pressure device control apparatus according to claim 14, wherein said pressure source includes a relief valve to be opened so as to release the pressure in said accumulator in response to the pressure accumulated in the accumulator becoming equal to or more than a third predetermined pressure which is higher than the second predetermined pressure, and wherein said predetermined delay time set in said drive control means is determined such that the pressure in said accumulator during stopping of the operation of said pump is less than the third predetermined pressure.

16. A problem diagnosis system in a pressure device control apparatus according to claim 1, wherein said deciding means decides that there is a venting of gas occurring in the accumulator during a time from an instant when the driving signal indicative of a command to drive the pump is outputted from said drive control means in response to the detection pressure detected in said pressure detector becoming equal to or less than the first predetermined pressure after the completion of the energization of said normally-closed type solenoid valve by said first energizing means to an instant when the second predetermined pressure is detected by the pressure detector is less than a defined time, and wherein said deciding means further decides that there is a leakage occurring in said normally-closed type solenoid valve when said time is equal to or more than said defined time.

17. A problem diagnosis system in a pressure device control apparatus according to claim 16, wherein said pressure device is carried in an automobile, and wherein said control unit has a back-up power source connected thereto for supplying an electric power regardless of the operational condition of an engine mounted in the automobile, and wherein said control unit includes a memory for storing data on a decision that there is a venting of gas occurring in the accumulator or a leakage occurring in the normally-closed type solenoid valve in response to said decision by the deciding means and for outputting command signals for commanding prohibition of the operation of said pressure device and for commanding an alarming operation of an alarm means while the stored condition in the memory is being sustained, said memory being arranged to release the stored data that there is a venting of gas occurring in the accumulator, if such data is stored, in response to a disconnection of the control unit and the back-up power source from each other, and also arranged to release the stored data that there is a leakage occurring in the normally-closed type solenoid valve, if such data is stored, in response to one of the disconnections between the control unit and the back-up power source from each other, and a stopping of the operation of the engine.

* * * * *